US008951118B2

(12) United States Patent
Noda

(10) Patent No.: US 8,951,118 B2
(45) **Date of Patent: *Feb. 10, 2015**

(54) GAMING MACHINE CAPABLE OF POSITIONALLY CHANGING SOUND IMAGE

(71) Applicants: Universal Entertainment Corporation, Tokyo (JP); Aruze Gaming America, Inc., Las Vegas, NV (US)

(72) Inventor: Satoru Noda, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/159,542

(22) Filed: Jan. 21, 2014

(65) Prior Publication Data

US 2014/0135127 A1 May 15, 2014

Related U.S. Application Data

(63) Continuation of application No. 13/150,695, filed on Jun. 1, 2011, now Pat. No. 8,663,006.

(30) Foreign Application Priority Data

Jun. 8, 2010 (JP) ................................ 2010-131524

(51) Int. Cl.
*G07F 17/32* (2006.01)
*A63F 13/00* (2014.01)
*G07F 17/34* (2006.01)

(52) U.S. Cl.
CPC ........ *G07F 17/3211* (2013.01); *G07F 17/3216* (2013.01); *G07F 17/34* (2013.01)
USPC .................... 463/31; 463/30; 463/35; 463/46

(58) Field of Classification Search
USPC ........................................ 463/30–31, 35, 46
See application file for complete search history.

(56) References Cited

U.S. PATENT DOCUMENTS

| | | | | |
|---|---|---|---|---|
| 5,291,556 | A | 3/1994 | Gale | |
| 5,768,393 | A * | 6/1998 | Mukojima et al. | 381/17 |
| 5,862,229 | A | 1/1999 | Shimizu | |
| 6,012,983 | A | 1/2000 | Walker | |
| 6,093,102 | A | 7/2000 | Bennett | |
| 6,477,256 | B1 | 11/2002 | Stoehr | |
| 6,647,119 | B1 | 11/2003 | Slezak | |
| 6,960,133 | B1 | 11/2005 | Marks | |
| 7,602,924 | B2 | 10/2009 | Kleen | |
| 2009/0023491 | A1 | 1/2009 | Ikeya | |
| 2011/0045905 | A1 | 2/2011 | Radek | |
| 2012/0070021 | A1 | 3/2012 | Yoo | |

* cited by examiner

*Primary Examiner* — Dmitry Suhol
*Assistant Examiner* — David Duffy
(74) *Attorney, Agent, or Firm* — Lexyoume IP Meister, PLLC

(57) ABSTRACT

The present invention provides a gaming machine which is capable of remarkably improving an effect given to a player. The gaming machine according to the present invention is provided with: a cabinet having a display portion for making a display according to the contents of a game played; a plurality of speakers 112A to 112D which are provided at their appropriate positions which are different from each other in height; and a control means for positionally changing a sound image of a sound that is outputted from a respective one of the speakers 112A to 112D, whereby a plurality of speakers 112A to 112D are provided at a top and a bottom of the gaming machine. A variety of effects exerted by means of sound can be provided in such a manner as if a position of a sound source were changed by positionally changing the sound image of the sound that is outputted from a respective one of these speakers 112A to 112D.

12 Claims, 28 Drawing Sheets

FIG. 5

| | FIRST PAYOUT RATE (90%) | SECOND PAYOUT RATE (98.6%) |
|---|---|---|
| BASIC BET | 30 | 30+5 |
| BASE PO | 30.0% | 25.7% |
| WINNING PROBABILITY OF BONUS | 1/120 (0.84%) | 1/60 (1.67%) |
| EXPECTATION VALUE (BIG) (MAGNIFICATION) | 2,212 CREDITS (73.7 TIMES) | 2,446 CREDITS (69.9 TIMES) |
| EXPECTATION VALUE (SMALL) (MAGNIFICATION) | | 612 CREDITS (17.5 TIMES) |
| EXPECTATION VALUE (AVERAGE PER 60 GAMES) (MAGNIFICATION) | 1106 CREDITS (36.9 TIMES) | 1529 CREDITS (43.7 TIMES) |

FIG. 10

| | First video reel | Second video reel | Third video reel | Fourth video reel | Fifth video reel |
|---|---|---|---|---|---|
| Code number | Symbol | Symbol | Symbol | Symbol | Symbol |
| 00 | JACKPOT 7 | JACKPOT 7 | JACKPOT 7 | JACKPOT 7 | JACKPOT 7 |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | ORANGE | CHERRY | ORANGE | BELL | PLUM |
| 05 | PLUM | ORANGE | PLUM | PLUM | BLUE 7 |
| 06 | ORANGE | PLUM | ORANGE | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | BELL |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CHERRY | CHERRY |
| 17 | PLUM | STRAWBERRY | PLUM | BELL | ORANGE |
| 18 | ORANGE | PLUM | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 12

Symbol combination table

| Combination of symbols | | | | | Number of payouts | Winning combination |
|---|---|---|---|---|---|---|
| First video reel | Second video reel | Third video reel | Fourth video reel | Fifth video reel | | |
| JACKPOT 7 | JACKPOT 7 | JACKPOT 7 | JACKPOT 7 | JACKPOT 7 | Amount of jackpot | Jackpot |
| APPLE | APPLE | APPLE | APPLE | APPLE | Bonus game※ | Bonus game trigger |
| BLUE 7 | BLUE 7 | BLUE 7 | BLUE 7 | BLUE 7 | 10 | BLUE |
| BELL | BELL | BELL | BELL | BELL | 8 | BELL |
| CHERRY | CHERRY | CHERRY | CHERRY | CHERRY | 5 | CHERRY 3 |
| STRAWBERRY | STRAWBERRY | STRAWBERRY | STRAWBERRY | STRAWBERRY | 5 | STRAWBERRY |
| PLUM | PLUM | PLUM | PLUM | PLUM | 4 | PLUM |
| ORANGE | ORANGE | ORANGE | ORANGE | ORANGE | 3 | ORANGE 3 |
| CHERRY | CHERRY | CHERRY | (ANY) | (ANY) | 2 | CHERRY 2 |
| ORANGE | ORANGE | ORANGE | (ANY) | (ANY) | 2 | ORANGE 2 |
| CHERRY | (ANY) | (ANY) | (ANY) | (ANY) | 1 | CHERRY 1 |
| ORANGE | (ANY) | (ANY) | (ANY) | (ANY) | 1 | ORANGE 1 |

※Free games of the number of times determined by lottery are conducted.

FIG. 25

| POSITION OF SEVEN-SEGMENT LIGHT EMITTING DIODE (LED) CAUSED TO EMIT LIGHT | SOUND IMAGE OF EFFECT SOUND |
|---|---|
| 1 (LOWEST) | 1 (LOWEST) |
| 2 (SECOND LOWEST) | 2 (SECOND LOWEST) |
| 3 (THIRD LOWEST) | 3 (THIRD LOWEST) |
| 4 (FOURTH LOWEST) | 4 (FOURTH LOWEST) |
| 5 (FIFTH LOWEST) | 5 (FIFTH LOWEST) |

GAMING MACHINE CAPABLE OF POSITIONALLY CHANGING SOUND IMAGE

CROSS REFERENCE TO RELATED APPLICATIONS

This application is a continuation of U.S. patent application Ser. No. 13/150,695, filed on Jun. 1, 2011, now U.S. Pat. No. 8,663,006, which claimed priority of Japanese Patent Application No. 2010-131524 filed on Jun. 8, 2010. The contents of these applications are incorporated herein by reference in their entirety.

BACKGROUND OF THE INVENTION

1. Field of the Invention

The present invention relates to a gaming machine for providing an effect exerted by means of sound.

2. Description of the Related Art

Conventionally, there have been known gaming machines called slot machines in which plural types of symbols are stop-displayed after being scroll-displayed and then a predetermined amount of gaming mediums (for example, a predetermined number of coins or a predetermined amount of money) are given on the basis of a combination of the stop-displayed symbols. Such slot machines are disclosed in U.S. Pat. Nos. 6,960,133, 6,012,983, and 6,093,102 or the like.

However, in the conventional gaming machines, since a display portion is provided for displaying the contents of game and then an effect is provided by means of image that is displayed on this display portion, players need to play a game while always seeing the same screen; and therefore, there has been a problem that an effect given to the players tends to be monotonous.

The present invention has been made in view of the problem described above, and it is an object of the present invention to provide a gaming machine which is capable of improving the effect given to players more remarkably.

SUMMARY OF THE INVENTION

The present invention provides following a gaming machine. According to one aspect of the invention, there is provided a gaming machine which includes a cabinet having a display portion for make a display according to a content of a game played; a plurality of speakers which are provided at positions which are different from each other in height; and a control means for positionally changing a sound image of a sound which is outputted from a respective one of the speakers.

According to this configuration, a plurality of speakers are provided at a top and a bottom of the configuration, and by varying a sound image of sounds that are outputted from these speakers, a variety of effects exerted by means of sound can be provided in such a manner as if the position of a sound source were changed.

According to another aspect of the invention, abovementioned in configuration, the control means positionally changes the sound image in accordance with a movement of effect light which is displayed at the display portion, in a direction which is associated with a direction of the movement of the light.

According to this configuration, when an effect exerted by means of image or light is provided in accordance with the contents of the effect, a sound image can be varied in response to movement of the image or light exerted by means of visual display thereof, and the contents of effect can be diversified. For example, when an effect is provided in such a manner that light moves upward from a display portion having displayed the contents of game thereon, the effect is provided in such a manner as if the sound source of a sound were moving with the movement of the light. This enables a player to pay his or her attention in a variety of directions and enables the effect of the game played to be enhanced remarkably. That is, a sound image is positionally changed in a direction allowing a player to pay his or her attention, thereby causing the player to pay his or her attention in that direction by means of sound as well as by movement of light. Accordingly, an element of direction can be added to an element of effect, enabling provision of more various effects.

According to yet another aspect of the invention, abovementioned in configuration, the control means positionally changes the sound image stepwise in a vertical direction, according to the content of the game played.

According to this configuration, there may be a case where the contents of game advance in a stepwise manner or where an effect exerted by means of light is provided in a stepwise manner. In such a case, a sound is varied in a stepwise manner according to the progress of the game or effect, whereby a stepwise effect exerted by means of image or light and a stepwise effect exerted by means of sound are allowed to coincide with each other for a player. In this manner, an effect can be enhanced remarkably. For example, the player's attention can be drawn by providing an effect in such a manner that a continuously moving sound image suddenly stops.

According to yet another aspect of the invention, abovementioned in either one of configuration, the cabinet comprises: a first cabinet portion having a first display portion for making a display relating to a progress of a game played, as the content of the game played; and a second cabinet portion having a second display portion for making an effect display according to the content of the game played; and the plurality of speakers are provided at a respective one of the first cabinet portion and the second cabinet portion.

According to this configuration, in a gaming machine having a second display portion upward of a first display portion, when an effect exerted by means of image or light is provided at the second display portion, the effect can be provided in such a manner as if the generation source of a sound were moving upward (to the second display portion). In this manner, a player's attention can be moved to the second display portion, and as a result, the effect exerted by means of the second display portion can be enhanced remarkably.

According to the present invention, there can be provided a gaming machine which is capable of improving an effect given to a player remarkably by varying a sound image of the sound outputted from speakers.

BRIEF DESCRIPTION OF THE DRAWINGS

FIG. 5 is a view showing an expectation value of the number of credits in the gaming machine according to the embodiment of the present invention in relationship with the number of basic games in a second payout rate.

FIG. 10 is a view showing arrays of symbols drawn on peripheral faces of reels in the gaming machine according to the embodiment of the present invention.

FIG. 12 is a view showing a symbol combination table according to the embodiment of the present invention.

FIG. 25 is a view showing a table of effect sounds in the gaming machine according to the embodiment of the present invention.

DESCRIPTION OF THE PREFERRED EMBODIMENTS

Hereinafter, embodiments of the present invention will be described with reference to the drawings.

[Explanation of Function Flow Diagram]

Figure 1:
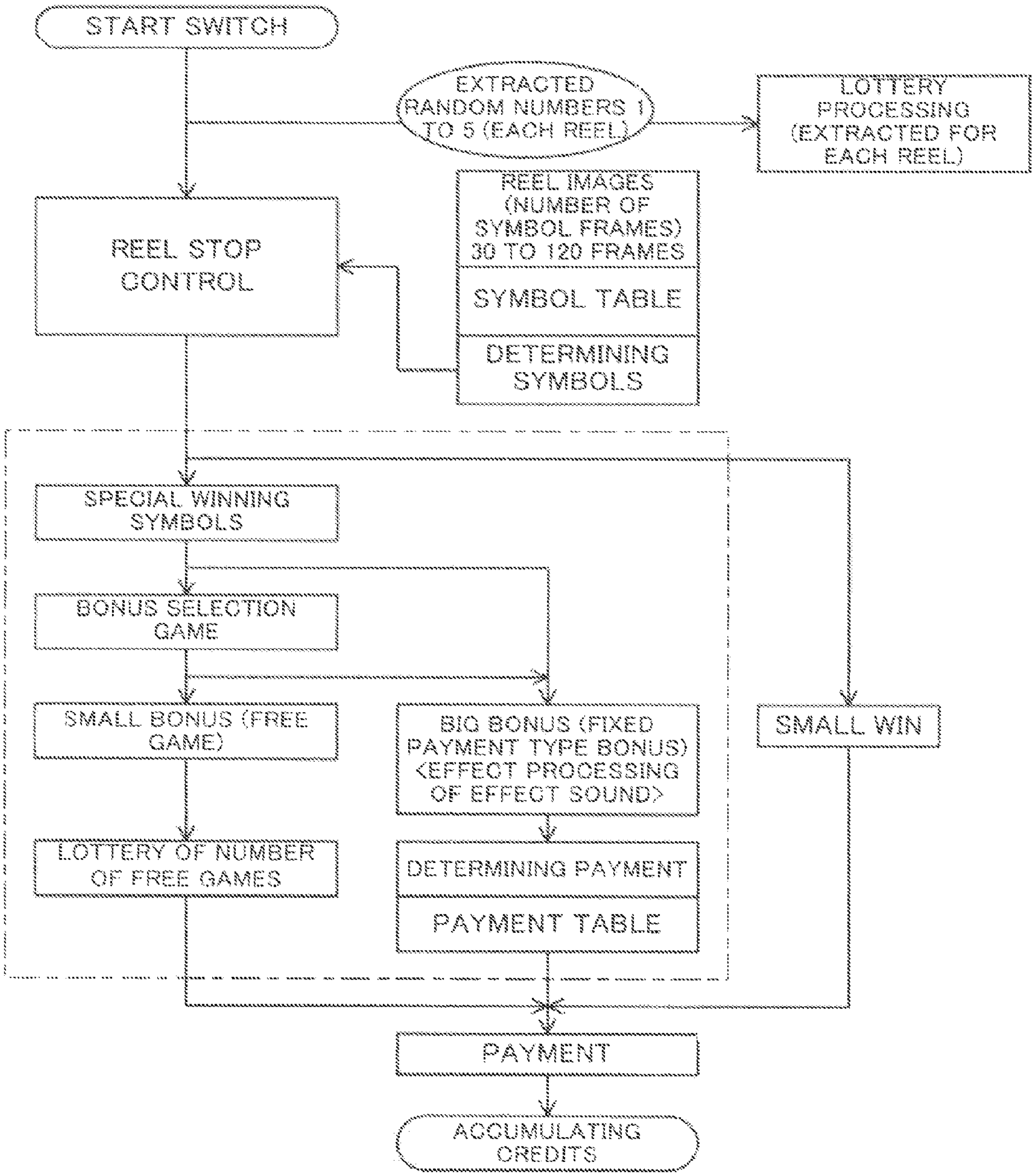
FIG. 1 is a block diagram depicting a functional flowchart of a gaming machine according to an embodiment of the present invention.

With reference to FIG. 1, basic functions of the gaming machine according to the present embodiment are described. FIG. 1 is a view illustrating a function flow of the gaming machine according to the embodiment of the present invention.

<Coin-Insertion/Start-Check>

First, the gaming machine checks whether or not a BET button has been pressed by the player, and then, based on an operation of a selection switch, the gaming machine checks which one of a first payout rate and a second payout rate which is higher than the first one has been selected as a payout rate. Subsequently checks whether or not a spin button has been pressed by the player.

<Lottery Processing/Symbol Determination Processing>

Next, when the spin button has been pressed by the player, the gaming machine extracts random values for symbol determination, and determines symbols to be displayed at the time of stopping scrolling of symbol arrays for the player, for a plurality of respective video reels displayed to a display.

<Reel Stop Control/Symbol Display>

Next, the gaming machine starts scrolling of the symbol array of each of the video reels and then stops scrolling so that the determined symbols are displayed for the player.

<Winning Determination>

When scrolling of the symbol array of each video reel has been stopped, the gaming machine determines whether or not a combination of symbols displayed for the player is a combination related to winning. Symbols associated with winning combinations include a small win and a special winning symbol combination (a big win).

In the case where a combination of symbols displayed corresponds to a special winning symbol combination, a big bonus is realized when a first payout rate is established. When a second payout rate is established, either of the big bonus and a small bonus is realized according to a result obtained by executing a bonus selection game. The big bonus is directed to a fixed payment type bonus, and in the case of the big bonus, a payment is determined in accordance with a payment table. The small bonus is directed to a free game type bonus. Namely, the free game is directed to a game in which the lottery according to determination of the symbols to be stopped, described previously, is performed over a predetermined number of times without consuming a coin. In the case of the small bonus, lottery is performed for the number of free games.

<Dividend/Payout>

When the combination of symbols displayed for the player is a combination related to winning, the gaming machine offers benefits according to the combination to the player.

For example, when a combination of symbols related to a payout of coins has been displayed, the gaming machine pays out coins of the number corresponding to the combination of symbols to the player.

Further, when a combination of symbols (trigger symbols) related to a free game trigger has been displayed, the gaming machine starts the free game. In the embodiment, it is assumed that a big bonus game (a first bonus game) or a small bonus game (a second bonus game) is played as a bonus game.

When a combination of symbols related to a jackpot trigger is displayed, the gaming machine pays out coins in an amount of jackpot to the player. The jackpot refers to a function which accumulates parts of coins used by players at the respective gaming machines as the amount of jackpot and which, when the jackpot trigger has been established in any of the gaming machines, pays out coins of the accumulated amount of jackpot to that gaming machine.

In each game, the gaming machine calculates the amount (amount for accumulation) to be accumulated to the amount of jackpot and transmits to an external control device. The external control device accumulates to the amount of jackpot the amounts for accumulation transmitted from the respective gaming machines.

Further, in addition to the aforementioned benefits, the gaming machine is provided with benefits such as a mystery bonus and insurance.

The mystery bonus is a bonus in which a predetermined amount of coins are paid out for winning of a lottery that is intended for the mystery bonus. When the spin button has been pressed, the gaming machine extracts a random value for mystery bonus and determines whether or not to establish a mystery bonus by lottery.

The insurance is a function provided for a purpose of relieving the player from a situation in which a free game has not been played for long periods of time. In the present embodiment, the player can arbitrarily select whether or not to make the insurance effective. Making insurance effective requires a predetermined insurance-purchase amount to be paid in exchange.

In the case where the insurance has been made effective, the gaming machine starts counting the number of games. The gaming machine conducts a payout of coins of the amount that is set for the insurance, when the number of counted games has reached a previously determined number of times without a large amount of payout relating to a free game or the like being conducted.

<Determination of Effects>

The gaming machine produces effects by displaying images to the display, outputting the light from lamps, and outputting sounds from speakers. The gaming machine extracts a random value for effect and determines contents of the effects based on the symbols and the like determined by lottery.

[Overall Game System]

Figure 2:
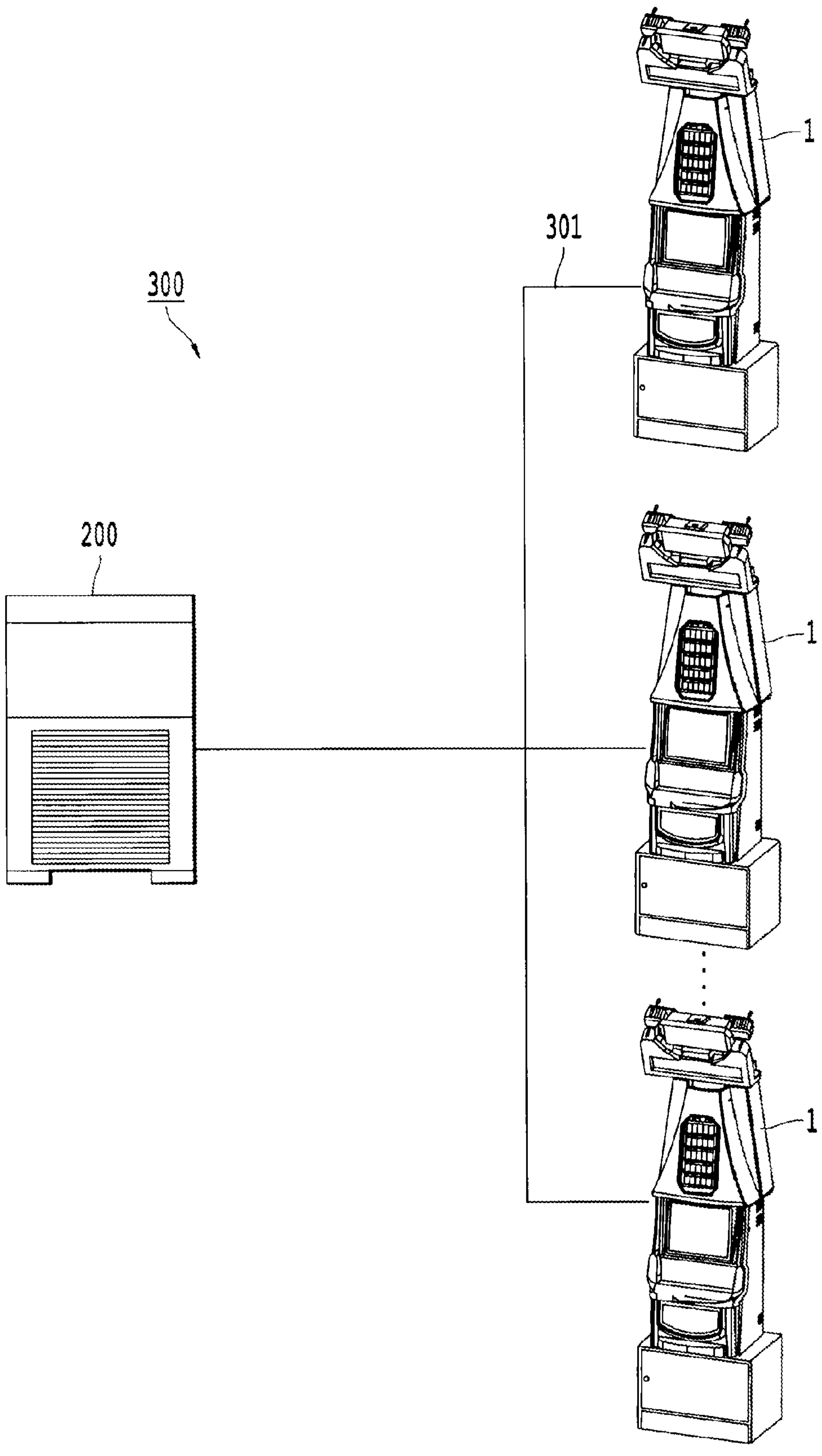
FIG. 2 is a view showing a gaming system including gaming machines according to an embodiment of the present invention.

The basic functions of the gaming machine have been described above. Next, with reference to FIG. 2, a game system including the gaming machine is described. FIG. 2 is a view illustrating the game system including the gaming machine according to the embodiment of the present invention.

A game system 300 includes the plurality of gaming machines 1, and an external control device 200 that is connected to each of the gaming machines 1 through a communication line 301.

The external control device 200 is for controlling the plurality of gaming machines 1. In the present embodiment, the external control device 200 is a so-called hall server which is installed in a game facility having the plurality of gaming machines 1. Each of the gaming machines 1 is provided with a unique identification number, and the external control device 200 identifies transmission sources of data transmitted from the respective gaming machines 1 by using the identification numbers. Also in the case where the external control device 200 transmits data to a gaming machine 1, the identification numbers are used for specifying the transmission destination.

It is to be noted that the game system 300 may be constructed within a single game facility where various games can be conducted, such as a casino, or may be constructed among a plurality of game facilities. Further, when the game system 300 is constructed in a single game facility, the game system 300 may be constructed in each floor or section of the game facility. The communication line 301 may be a wired or wireless line, and can adopt a dedicated line, an exchange line or the like.

[Overall Configuration of Gaming Machine]

Figure 3:
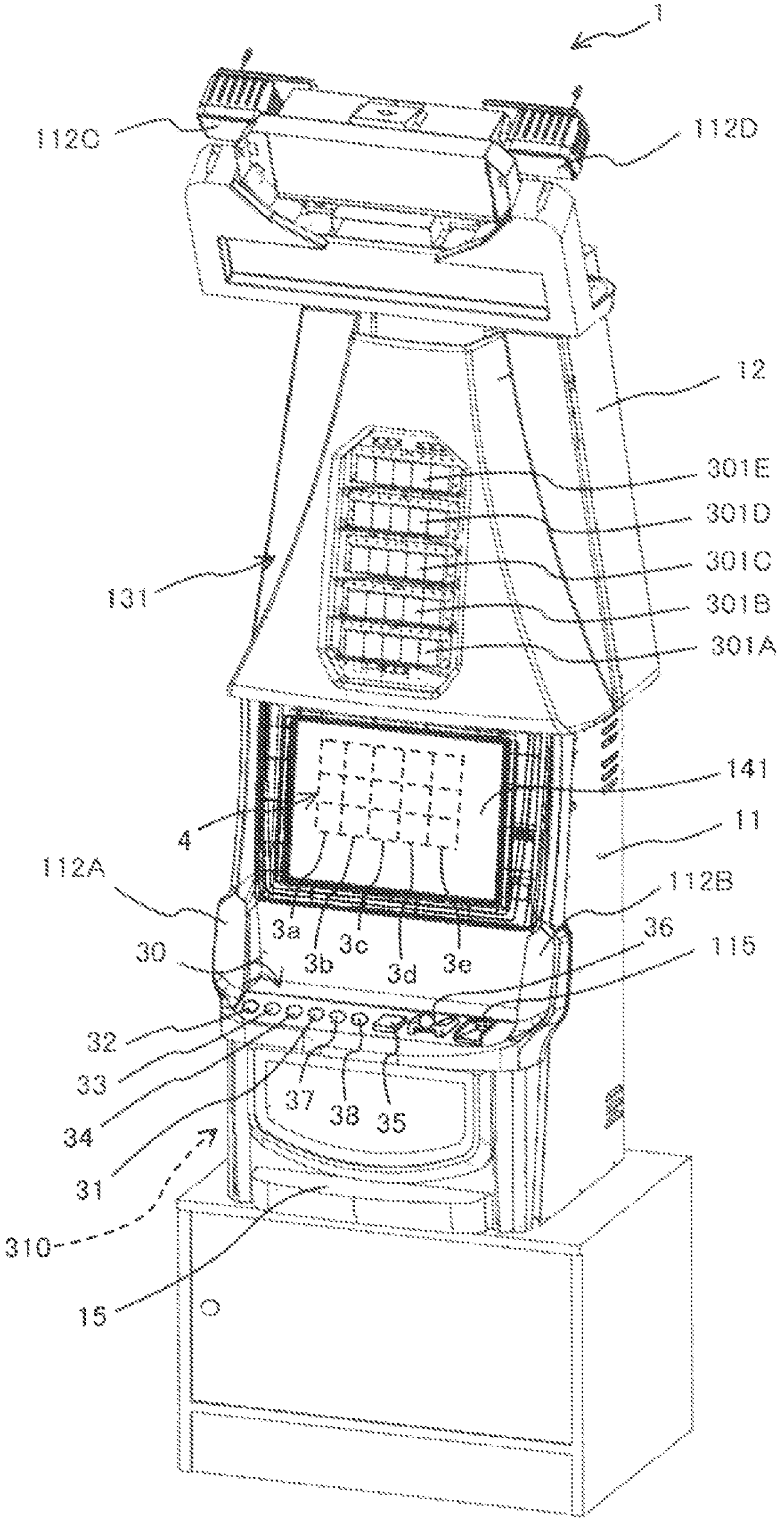
FIG. 3 is a perspective view showing an entire configuration of the gaming machine according to the embodiment of the present invention.

The game system according to the present embodiment has been described above. Next, with reference to FIG. 3, an overall configuration of the gaming machine 1 is described. FIG. 3 is a view illustrating the overall configuration of the gaming machine according to the embodiment of the present invention.

A coin, a bill, or electrically valuable information corresponding to these is used as a game medium in the gaming machine 1. Further, in the present embodiment, a later-described ticket with a barcode is also used. It is to be noted that the game medium is not limited to these, and for example a medal, a token, electric money or the like can be adopted.

The gaming machine 1 includes a cabinet 11, a top box 12 installed on the upper side of the cabinet 11, and a main door 13 provided at the front face of the cabinet 11.

A lower image display panel 141 is provided at the center of the main door 13. The lower image display panel 141 includes a liquid crystal panel, and forms the display. The lower image display panel 141 has a symbol display region 4. To the symbol display region 4, five video reels 3 (3*a*, 3*b*, 3*c*, 3*d*, 3*e*) are displayed.

In the present embodiment, a video reel depicts through videos the rotational and stop motions of a mechanical reel having a plurality of symbols drawn on the peripheral surface thereof. To each of the video reels 3, a symbol array comprised of a previously determined plurality (22 in the present embodiment) of symbols is assigned (see FIG. 10 which is described later).

In the symbol display region 4, the symbol arrays assigned to the respective video reels 3 are separately scrolled, and are stopped after predetermined time has elapsed. As a result, a part (three consecutive symbols in the present embodiment) of each of the symbol arrays is displayed for the player.

The symbol display region 4 has three regions, namely an upper region, an central region, and a lower region, for each video reel 3, and a single symbol is to be displayed to each region. That is, 15 (=5 columns×3 symbols) symbols are to be displayed in the symbol display region 4.

In the present embodiment, a line formed by selecting one of the aforementioned three regions for each of the video reels 3 and connecting the respective regions is referred to as a winning line (hereinafter also referred to as a "pay line").

It is to be noted that any desired shape of the winning line can be adopted, and examples of the shape of the winning line may include a straight line formed by connecting the central regions for the respective video reels 3, a V-shaped line, and a bent line. Also, any desired number of lines can be adopted, and the number can be for example 30 lines.

The lower image display panel 141 has a built-in touch panel 114. The player can input various commands by touching the lower image display panel 141.

On the lower side of the lower image display panel 141, there are arranged various buttons set in a control panel 30, and various devices to be operated by the player.

A spin button 31 is used when starting scrolling of the symbol arrays of the respective video reels 3. A change button 32 is used when requesting a game facility staff member to exchange money. A CASHOUT button 33 is used when paying out the coins retained inside the gaming machine 1 to a coin tray 15.

A 1-BET button 34 and a maximum BET button 35 are used for determining the number of coins (hereinafter also referred to as "the number of BETs") to be used in the game from the coins retained inside the gaming machine 1. The 1-BET button 34 is used when determining one coin at a time for the aforementioned number of BETs. The maximum BET button 35 is used when setting the aforementioned number of BETs to a defined upper limit number (for example 30 coins).

An additional BET button 38 is employed when a plurality of coins (for example, five coins) are betted in addition to an upper limit (for example, 30 coins) specified in a game. This additional betting of coins (for example, five coins) is directed to betting coins required to validate changing a basic game consumption time from a first consumption time to a second consumption time by means of operation of a mode change button 37 to be described later. Therefore, additional betting by means of the additional BET button 38 is valid only when the number of bets in a game has reached the specific upper limit (for example, 30 coins).

A basic game consumption time is directed to a required time from start to end of scrolling the symbol array of each video reel 3 in basic game. The second consumption time is shorter than the first consumption time.

The mode change button 37 is operated when a mode in basic game that a gaming machine 1 executes is changed to another mode which is different therefrom in consumption time. A basic game is directed to one game to be executed at the gaming machine 1 (hereinafter, a unitary game). The unitary games include a bonus game as well as the basic game. The basic game is directed to a game to be executed until symbols of a bonus game trigger to be described later are arranged on a winning line. The bonus game is directed to a game to be started after the symbols for the bonus game trigger are arranged on the winning line.

The base game consumption time is usually is set to a first consumption time. Then, additional betting of coins (for example, five coins) is performed by adding the betted coins to the specific upper limit (for example, 30 coins) in basic game. When the mode change button 37 is operated, the basic game consumption time is changed from the first consumption time to the second consumption time that is shorter than the first one.

The basic game consumption time may be changed from the second consumption time to the first consumption time by operating the mode change button 37. In that case, the second consumption time can be changed to the first consumption time by operating the mode change button 37 prior to starting betting in a next basic game after the completion of the basic game executed in the second consumption time.

The basic game consumption time can be automatically changed from the second consumption time to the first consumption time, for example, in the case where unitary games (a basic game and a bonus game) in gaming machine 1 are not continuously executed in a predetermined period of time.

In the gaming machine 1 of the embodiment, when the basic game consumption time is set to the first consumption time, a payout rate of the gaming machine 1 is set to a first payout rate (90%). Alternatively, when the basic game consumption time is set to the second consumption time, the payout rate of the gaming machine 1 is changed to a second payout rate (98.6%) which is higher than the first payout rate.

The payout rate is a value obtained by dividing the number of coins paid out to a player in unitary game that is started by operation of a start button 31 by the number of coins betted in unitary game. The unitary games referred to as herein include the basic game and the bonus game described above.

As described above, the payout rate of the gaming machine 1 is usually set to the first payout rate (90%). Then, additional betting of coins (for example, 30 coins+five coins=35 coins) is performed, and when the basic game consumption time is changed from the first consumption time to the second consumption time by operating the mode change button 37, the payout rate of the gaming machine 1 is changed from the first payout rate to the second payout rate.

In the case where the basic game consumption time is changed from the second consumption time to the first consumption time by operating the mode change button 37, or automatically, the payout rate of the gaming machine 1 is changed from the second payout rate to the first payout rate.

Figure 4:
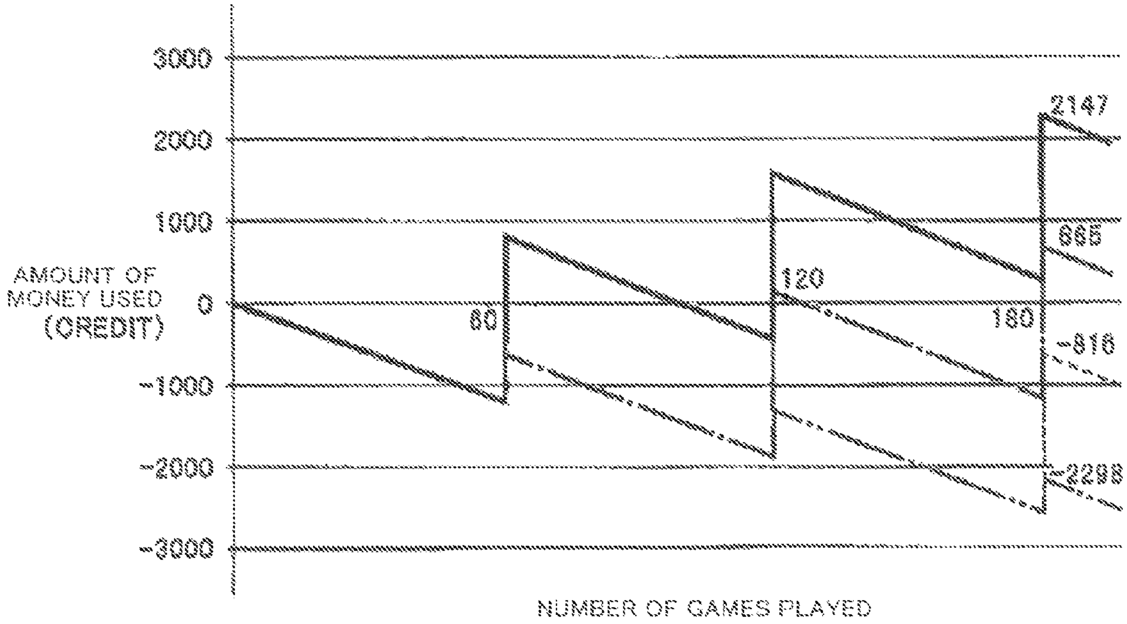
FIG. 4 is a characteristic view showing a variety of computations by payout rate in the gaming machine according to the embodiment of the present invention.

Next, with reference to FIG. 4, a difference between the first payout rate and the second payout rate will be described. FIG. 4 is a characteristic view showing a variety of computation values by payout rate in the gaming machine 1 according to the embodiment of the present invention.

In the case of the first payout rate (90%), a proportion of the payout rate in basic game is set to 30% (a proportion of the payout rate in bonus game is set to 60%). Alternatively, in the second payout rate (98.6%), a proportion of the payout rate in basic game is set to 25.7% (a proportion of the payout rate in bonus game is set to 71.1%). Namely, in the second payout rate, a proportion of the payout rate in bonus is higher than that of the first payout rate.

In the case of the second payout rate, a winning probability of bonus game is increased to two times (1/60) in comparison with that of the first payout rate (1/120). In the first payout rate, all bonus games are directed to big bonuses with a large number of payouts, whereas in the second payout rate, small bonuses with a smaller number of payouts than that of big bonuses coexist together with the big bonuses in the bonus games.

In the case of either of the first and second payout rates also, a bonus game is realized when the symbols for bonus game trigger are arranged. In the case of the first payout rate, the routine migrates to a bonus game for big bonus, immediately. In the case of the second payout rate, a bonus selection game is executed prior to migration to a bonus game, and either of the big bonus or a small bonus is determined. FIG. 4 shows a case in which a winning probability between the big bonus and the small bonus is 8:2.

In the case of the first payout rate, an expectation value of payout in big bonus is set to 73.7 times (2,212 coins) relative to a basic BET (30 coins), whereas in the case of the second payout rate, the value is set to 69.9 times (2,446 coins) relative to a basic BET (35 coins). On the other hand, an expectation value of payout in small bonus is set to 17.5 times (612 coins) relative to the basic BET (35 coins) in the second payout rate, and is about ¼ of the big bonus.

In the second payout rate, since the large bonus and the small bonus coexist, an average expectation value which is obtained by simply averaging the respective expectation values of payouts is set to 43.7 times (1,529 coins) relative to the basic BET (35 coins). On the other hand, in the first payout rate in which only a large bonus is realized, since the winning probability of bonus game is half of that in the second payout rate, half of the expectation value of payout in big bonus is obtained as an average expectation value. That value is set to 36.9 times (1,106 coins) relative to the basic BET (30 coins).

Therefore, in the case of the second payout rate, a player has a possibility of winning bonus game more frequently in comparison with the case of the first payout rate. In terms of the expectation value of payout per bonus game, the first payout rate is apparently higher than the second payout rate, since no small bonus coexist. However, since the first payout rate is only half of the second payout rate in winning probability of bonus game, in terms of the substantial expectation value of payout per bonus game, in consideration of the difference in winning probability, the second payout rate is higher than the first payout rate.

Next, with reference to FIG. 5, a description will be given with respect to a transition according to the number of games played by the number of credits (such as the number of coins) in the second payout rate. FIG. 5 is a view showing an expectation value of the number of credits in the gaming machine 1 according to the embodiment of the present invention in relationship with the number of basic games in the second payout rate.

In the case of the second payout rate, a margin in high or low expectation value of payout may take place according to whether a bonus game is set to a big bonus or a small bonus. For example, let us presuppose a case in which 180 games have been played, assuming that a player won a bonus game by 60 games in terms of probability. In the case where the player wins a big bonus every time a bonus game is played (the thick line in FIG. 4), a total number of credits (such as the number of coins) which has been set to "0" at the time of starting a game is computed as "2,147." Alternatively, in the case where the player wins a small bonus every time a bonus game is played (the single-dotted chain line in FIG. 5), the total number of credits (such as the number of coins) that has been set to "0" at the time of starting a game is computed as "−2,298." Therefore, in the second payout rate, a maximum difference of about 4,400 credits will occurs according to whether the bonus game is set to a big bonus or a small bonus.

Figure 18:
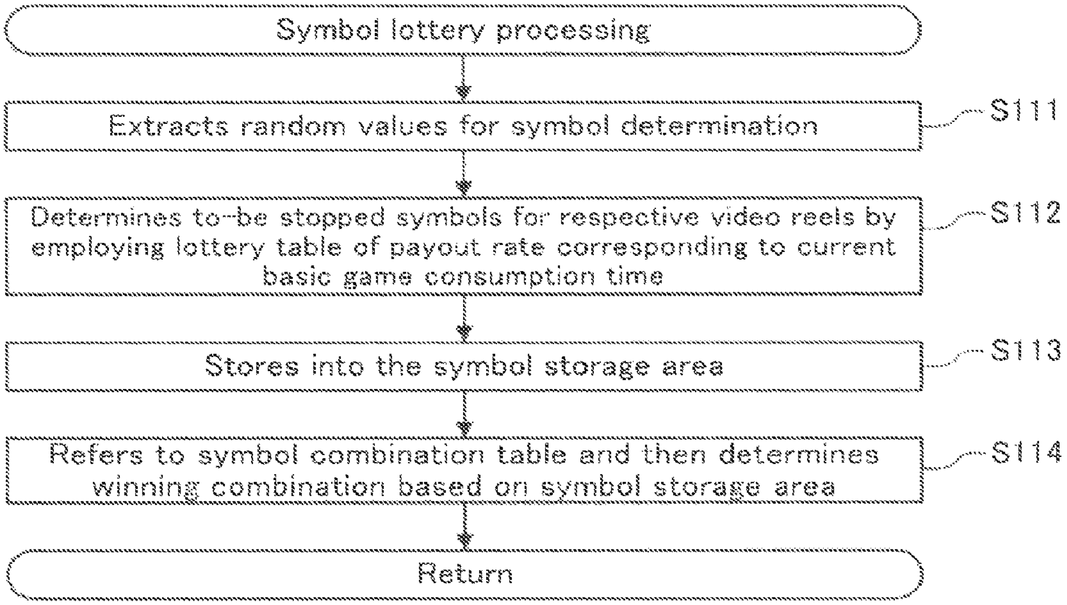
FIG. 18 is a flowchart showing symbol lottery processing in the gaming machine according to the embodiment of the present invention.

As has been described hereinabove, a winning probability of bonus game is different depending on when the payout rate is set to the first payout rate or second payout rate, and is also different depending on the presence or absence of small bonus at the time of winning a bonus game. Therefore, in the gaming machine 1 of the embodiment, a table for lottery to be employed at the time of performing symbol lottery processing to be described later with reference to FIG. 18 is different depending on when the payout rate is set to the first payout rate or the second payout rate.

A required time from start to end of one basic game is different depending on when the basic game consumption time is set to the first consumption time or the second consumption time. Specifically, the second consumption time is shorter than the first consumption time in terms of the basic game consumption time. The first consumption time and the second consumption time are set to an extent such that the sales of the gaming machine 1 in the case where a game has been continuously executed for a predetermined period of time are equal to each other irrespective of when the first payout rate is established at the time of executing a basic game in the first consumption time; and when the second payout rate is established at the time of executing a basic game in the second consumption time.

Speaking in detail, the first consumption time or the second consumption time is set so that a remaining number of coins obtained by subtracting the number of coins paid out from the number of coins consumed per unit working time in the case where a time interval at which a game has been continuously executed is defined as a working time of the gaming machine 1 is substantially equal to each other irrespective of when the first payout rate (the first consumption time) is established or when the second payout rate (the second consumption time) is established.

A term "the number of coins consumed" used herein denotes a total BET number of coins in game (including a basic game and a bonus game). A term "the number of coins paid out" used herein denotes the number of coins paid out in game (including a basic game and a bonus game). A term "substantially equal" used herein denotes an extent such that a difference in the remaining number of coins is included in the range of a predetermined allowable tolerance.

Further, in the gaming machine 1 of the embodiment, when the basic game consumption time is set to the first consumption time, a required time for effect to be provided by means of light in a lower image display panel 141 or a top box 12 to be described later, while in basic game, or a required time for effect sounds to be outputted from speakers 112 (112A to 112D) to be described later, is set to be equal to the first consumption time. Similarly, when the basic game consumption time is set to the second consumption time, a required time for effect image or a required time for effect sound is set to be equal to the second consumption time.

Therefore, in the gaming machine 1 of the embodiment, the required time for effect image or the required time for effect sound is set differently depending on when a basic game is executed in the first consumption time and when it is executed in the second consumption time. A method or the like of setting the required time for effect image and that for effect sound to be different from each other includes the one in which another effect image or effect sound is employed when a basic game is executed in the second consumption time, the contents of which are different from those of the one employed when a basic game is executed in the first consumption time, for example.

A coin accepting slot 36 is provided to accept coins. A bill validator 115 is provided to accept bills. The bill validator 115 validates whether or not a bill is legitimate and accepts a legitimate bill in a cabinet 11. The bill validator 115 may be constructed so as to be able to read a barcode-attached ticket 175 to be described later.

An upper effect portion 131 is provided on a front face of the top box 12. This upper effect portion 131 provides an effect exerted by means of light and sound, the effect being executed in a bonus game for big bonus in the gaming machine 1.

In the case of the embodiment, at the time of the play of a bonus game for big bonus, regions of nine steps called magnitudes ranging from "100" to "2,000" indicating eruption states of volcanoes in the upper effect portion 131 are used to determine a payment of the bonus game. A player selects three from among 10 volcanoes that are displayed on the lower image display panel 141, by means of touch operation, and then, acquires the number of eruption state step-ups assigned to the selected volcanoes. Lastly, the eruption state of the volcano in the upper effect portion 131 is stepped up according to a total value of the acquired three step-ups and then a payment of bonus game is determined according to the value that corresponds to the reached step (for example, "1,500" in the case where a seventh step is reached).

Figure 6:
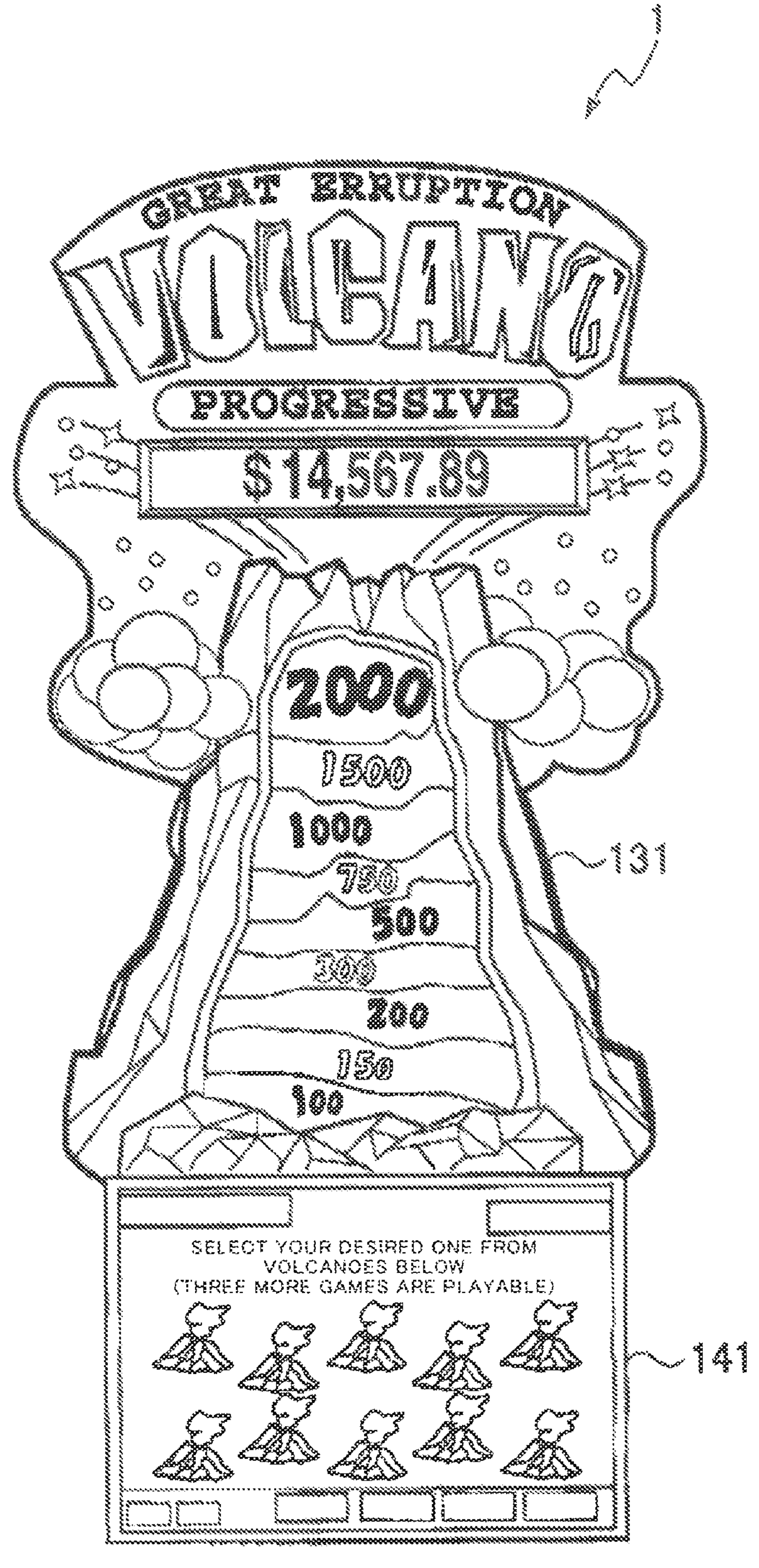
FIG. 6 is a front view showing an upper effect portion in the gaming machine according to the embodiment of the present invention.

Specifically, as shown in FIG. 6, a plurality of seven-segment LEDs 301A to 301E, which are assigned to each of nine steps, are provided in the upper effect portion 131 and then light is emitted stepwise by the number of steps that is sequentially determined in descending order, according to the total number of steps (magnitudes) that is determined at that time.

In this manner, an effect as if a volcano were erupting can be executed by means of an effect exerted by the light emitted from the LED.

In addition to the upper effect portion 131, speakers 112C and 112D are provided on the top box 12, and are adapted to provide an effect exerted by means of sound, together with the speakers 112A and 112B that are provided at the side of a cabinet 11. The term "speakers" used herein denotes the ones including speaker units which are provided for the tone areas such as a low tone, a middle tone, and a high tone, respectively.

That is, in the gaming machine 1, on the basis of the speakers 112A and 112B that are provided at the left and right of the cabinet 11, a surround system is constructed with: the speakers 112C and 112D that are further provided at the left and right of the top box 12; and a woofer 310. When an effect is provided which is exerted by means of the light from the upper effect portion 131 on the top box 12, an effect exerted by means of sound is adapted to be executed by means of the four speakers 112C to 112D and the woofer 310 by controlling: the outputs from the speaker 112A and 112D; the outputs from the speakers 112A and 112B at the side of the cabinet 11; and the output from the woofer 310.

Figure 7A:
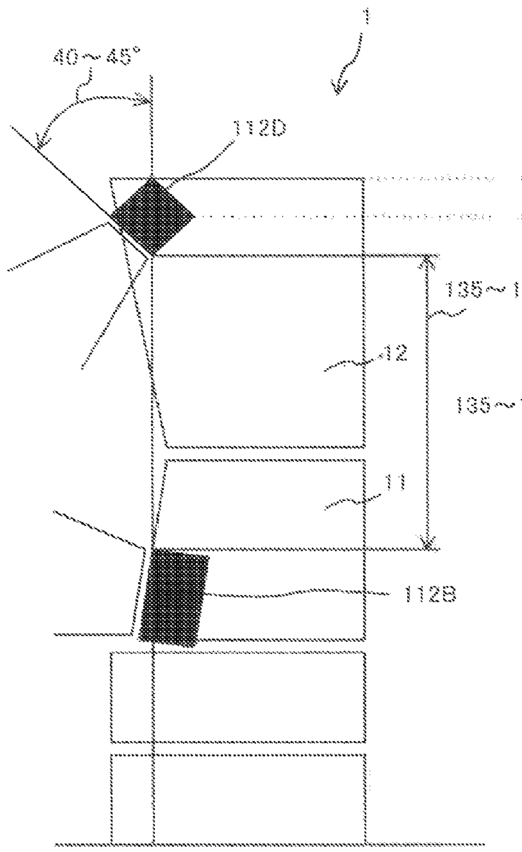
FIG. 7A is a side view showing a layout state of speakers in the gaming machine according to the embodiment of the present invention.
Figure 7B:
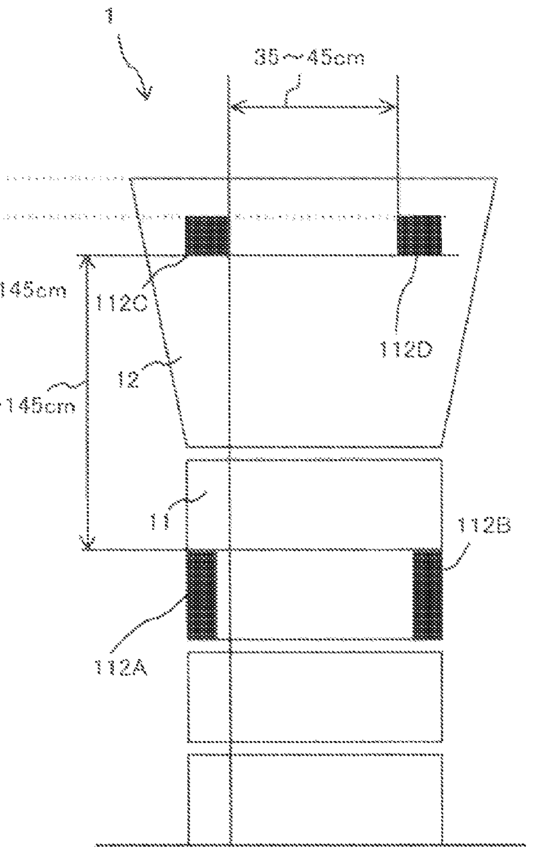
FIG. 7B is a front view showing a layout state of speakers in the gaming machine according to the embodiment of the present invention.

FIG. 7A is a view showing a side face of the gaming machine 1 and FIG. 7B is a view showing a front face of the gaming machine 1. As shown in FIG. 7B, the speakers 112A and 112B of the cabinet 11 are provided at the left and right of the cabinet 11, and as shown in FIG. 7A, the speakers 112C and 112D at the side of the top box 12 are provided at the left and right of the top box 12. In the case of the embodiment, the speakers 112C and 112D at the side of the top box 12 are horizontally provided with intervals of about 35 cm to 45 cm in location of about 135 cm to 145 cm upward of the speakers 112A and 112B at the side of the cabinet 11.

In addition, as shown in FIG. 7A, the speakers 112A and 112B at the side of the cabinet 11 are disposed slightly upward toward a player who plays at the gaming machine 1. The speakers 112C and 112D at the side of the top box 12 are disposed toward the player so that front face portions of these speakers are oriented downward at an angle of about 40 degrees to 45 degrees relative to a vertical plane. By disposing these speakers in this way, the effect sounds that are outputted from the respective speakers 112A to 112D are directly audible to the player. In the gaming machine 1, a 4.1-ch surround system can be constructed by controlling the phases or volumes of the effect sounds that are outputted from these four speakers 112A to 112D and the woofer 310 that is provided therein (see FIG. 28). In this manner, a sound image (the position of a sound source in the sense of a sound to which a player listens) can be moved in a vertical direction or in a horizontal direction. In particular, an effective effect can be provided by adding the effect exerted by means of the effect sounds outputted from the speakers 112A to 112D, together with an effect exerted by means of light, the effect being executed in the upper effect portion 131 of the top box 12. For example, when an effect is provided by the seven-segment LEDs 301A to 301E shown in FIG. 3, an audible direction is moved upward according to an activity of varying the light-emitting LEDs upward (switching the light-emitting LEDs in sequential order of 301A, 301B, 301C, 301D, 301E). This enables the player's attention to focus on the upper effect portion 131 of the top box 12 and then fully enables provision of the effect exerted by means of light in the upper effect portion 131. For example, there may be a case where an effect simulating the volcanoes shown in FIG. 6 is provided in the upper effect portion 131. In such a case, an effect control is performed in such a manner that the sound images of the effect sounds that are reproduced by means of the speakers 112A to 112D and the woofer 310 move upward in a stepwise manner as the light emitting position of light moves sequentially upward in a stepwise manner. According to such an effect, the movements of the light and sounds coincide with each other, whereby: an effect can be attained as if a sound were generated from the light (eruption of volcano) per se; and an effect with a sense of reality can be provided to a player.

Figure 8A:
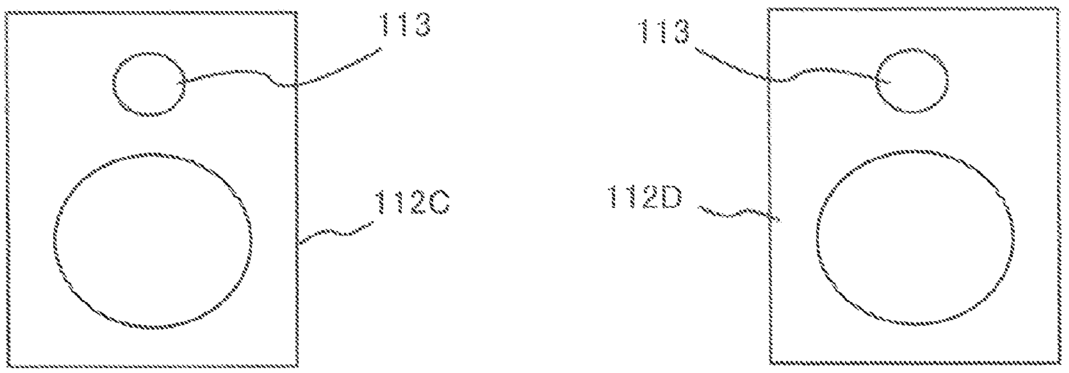
FIGS. 8A to 8B are views showing a position of a bass reflex of each of the speakers in the gaming machine according to the embodiment of the present invention.
Figure 8B:
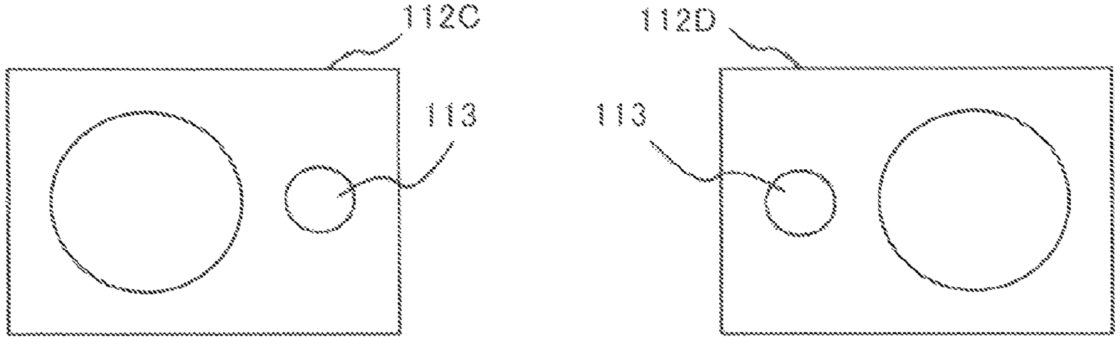

In the case where bass reflex type speakers are employed as the speakers 112C and 112D at the side of the top box 12, as shown in FIG. 8, at which they are placed vertically (FIG. 8A), each of the bass reflexes 113 is disposed upside. Alternatively, in the case where they are placed horizontally (FIG. 8B), each of the bass reflexes 113 are disposed inside. In this manner, the sound quality or sound image position of an effect sound that is audible to a player can be improved remarkably.

Figure 9A:
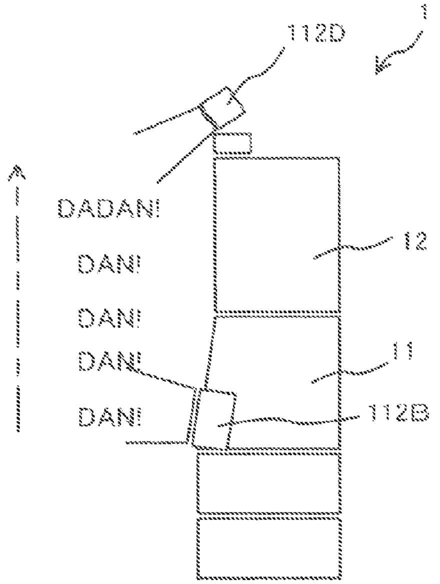
FIGS. 9A to 9C are side views showing generation examples of effect sounds in the gaming machine according to the embodiment of the present invention.
Figure 9B:
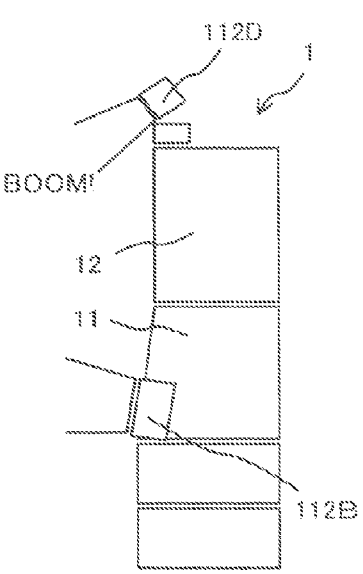
Figure 9C:
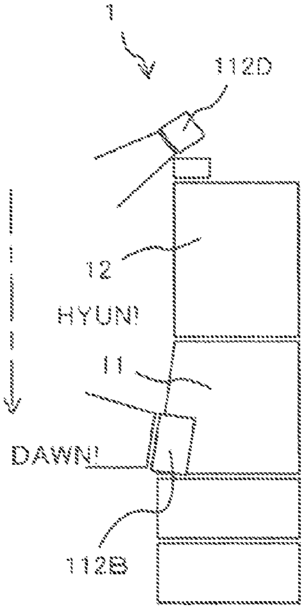

By controlling a direction in which effect sounds are audible by means of the plurality of speakers 112A to 112D, for example, as shown in FIG. 9, the effect sounds are moved from bottom to top (FIG. 9A) in accordance with an effect of the light exerted by the seven-segment LEDs 301A to 301E of the upper effect portion 131 (FIG. 3). This enables an eruption sound to be controlled (FIG. 9B) so as to be audible from an eruptive crater at a top part (FIG. 3). Further, an effect sound can be outputted in such a way that eruptive stones drop from top to bottom one after another and then a volcano erupts (FIG. 9C). Such a change of a player's vision is prompted by means of sound as well, whereby an effect exerted by the upper effect portion 131 can be reliably recognized by the player.

A ticket printer (not shown), a card slot (not shown), a data display (not shown), and a key pad (not shown) are provided to be oriented downward of the upper display effect portion 131.

The ticket printer prints on a ticket a barcode representing encoded data of the number of credits, date, the identification number of the gaming machine 1, and the like, and outputs the ticket as the ticket with a barcode. The player can make a gaming machine read the ticket with a barcode so as to play a game thereon, and can also exchange the ticket with a barcode with a bill or the like at a predetermined place (e.g. a cashier in a casino) in the game facility.

The card slot is for inserting a card in which predetermined data is stored. For example, the card stores data for identifying the player, and data about the history of games played by the player.

When the card is inserted into the card slot, a later-described card reader reads data from the card or writes data into the card. It is to be noted that the card may store data corresponding to a coin, a bill or a credit.

The data display includes a fluorescent display, LEDs and the like, and displays the data read by the card reader or the data inputted by the player via the keypad, for example. The keypad is for inputting a command and data related to ticket issuance or the like.

[Symbol Arrays of Video Reels]

The overall configuration of the gaming machine 1 has been described above. Next, with reference to FIG. 10, a configuration of the symbol arrays included in the video reels 3 of the gaming machine 1 is described. FIG. 10 is a view illustrating the arrangements of symbols drawn on the peripheral surfaces of the video reels of the gaming machine 1 according to the embodiment of the present invention.

A first video reel 3*a*, a second video reel 3*b*, a third video reel 3*c*, a fourth video reel 3*d*, and a fifth video reel 3*e* each is assigned with a symbol array consisting of 22 symbols that correspond to respective code numbers from "00" to "21".

Types of the symbols provided are "JACKPOT 7", "BLUE 7", "BELL", "CHERRY", "STRAWBERRY", "PLUM", "ORANGE", and "APPLE".

[Configuration of Circuit Included in Gaming Machine]

Figure 11:
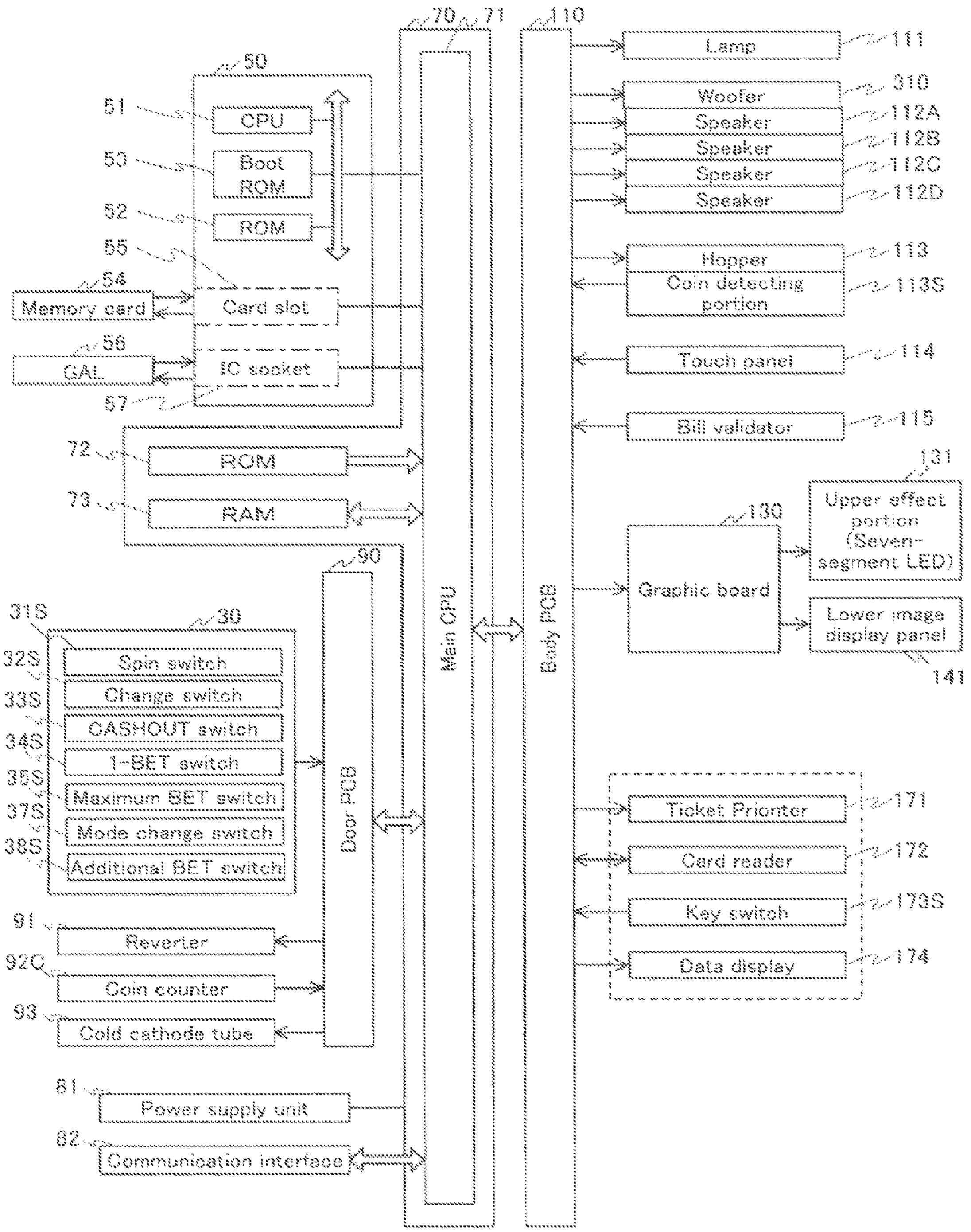
FIG. 11 is a block diagram depicting an internal configuration of the gaming machine according to the embodiment of the present invention.

The configuration of the symbol arrays included in the video reels 3 of the gaming machine 1 has been described above. Next, with reference to FIG. 11, a configuration of a circuit included in the gaming machine 1 is described. FIG. 11 is a block diagram illustrating an internal configuration of the gaming machine according to the embodiment of the present invention.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression, a lottery program, and a program for producing effects by images and sounds (e.g. see FIGS. 13 to 26 which are described later). Further, the aforementioned game program includes data (see FIG. 10) specifying the configuration of the symbol array assigned to each video reel 3. The aforementioned game program also includes data showing a number-of-additional-free-games selection table.

The lottery program is a program for determining to-be stopped symbol of each video reel 3 by lottery. The to-be stopped symbol is data for determining four symbols to be displayed to the symbol display region 4 out of the 22 symbols forming each symbol array. The gaming machine 1 of the present embodiment determines as the to-be stopped symbol the symbol to be displayed in a predetermined region (the upper region) out of the four regions provided for each of the video reels 3 of the symbol display region 4.

The aforementioned lottery program includes symbol determination data. The symbol determination data is data that specifies random values so that each of the 22 symbols (code numbers from "00" to "21") forming the symbol array is determined at an equal probability (i.e. 1/22), for each video reel 3.

The probabilities of the respective 22 symbols being determined are basically equal. However, the numbers of the respective types of symbols included in the 22 symbols vary, and thus the probabilities of the respective types of symbols being determined vary (i.e. different weights on the probabilities are generated). For example, with reference to FIG. 10, the symbol array of the first video reel 3*a* includes one symbol of "STRAWBERRY", and includes four symbols of "BLUE 7". Hence, the former is determined at the probability of "1/22", whereas the latter is determined at the probability of "4/22".

It is to be noted that, although the data specifies that the equal numbers of symbols be provided to form the symbol arrays of the respective video reels 3 in the present embodiment, different numbers of symbols may form the respective video reels 3. For example, the symbol array of the first video reel 3*a* may consist of 22 symbols whereas the symbol array of the second video reel 3*b* may consist of 30 symbols. Such a configuration increases the degree of freedom in setting the probabilities of the respective types of symbols being determined for each video reel 3.

Further, the card slot 55 is configured so that the memory card 54 can be inserted thereinto and removed therefrom, and is connected to a motherboard 70 by an IDE bus.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the gaming machine 1 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like.

The authentication program is a program (tamper check program) for authenticating the game program and the game system program. The pre-authentication program is a program for authenticating the aforementioned authentication program. The authentication program and the pre-authentication program are written along a procedure (authentication procedure) for proving that the program to be the subject has not been tampered.

The motherboard 70 is provided with a main CPU 71, a ROM 72, a RAM 73, and a communication interface 82. The motherboard 70 corresponds to the controller of the present invention.

The ROM 72 includes a memory device such as a flash memory, and stores a program such as BIOS to be executed by the main CPU 71, and permanent data. When the BIOS is executed by the main CPU 71, processing for initializing predetermined peripheral devices is conducted; further, through the gaming board 50, processing of loading the game program and the game system program stored in the memory card 54 is started.

The RAM 73 stores data and programs which are used in operation of the main CPU 71. For example, when the processing of loading the aforementioned game program, game system program or authentication program is conducted, the RAM 73 can store the program. These programs include a program of varying a sound image of an effect sound (a direction in which a sound is audible) by controlling the plurality of speakers 112A to 112D according to the contents of game. The RAM 73 is provided with working areas used for operations in execution of these programs. Examples of the areas include: an area that stores a counter for managing the number of games, the number of BETs, the number of payouts, the number of credits and the like; and an area that stores symbols (code numbers) determined by lottery, such as an area that stores a variety of flags.

The communication interface 82 is for communicating with the external control device 200 such as a server, through the communication line 301. Further, the motherboard 70 is connected with a later-described door PCB (Printed Circuit Board) 90 and a body PCB 110 by respective USBs. The motherboard 70 is also connected with a power supply unit 81.

When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71. The door PCB 70 is connected with a control panel 30, a reverter 91, a coin counter 92C and a cold cathode tube 93.

The control panel 30 is provided with a spin switch 31S, a change switch 32S, a CASHOUT switch 33S, a 1-BET switch 34S and a maximum BET switch 35S, a mode change switch 37S and an add BET switch 38S which correspond to the aforementioned respective buttons. Each of the switches outputs a signal to the main CPU 71 upon detection of press of the button corresponding thereto by the player.

The coin counter 92C validates a coin inserted into the coin accepting slot 36 based on its material, shape and the like, and outputs a signal to the main CPU 71 upon detection of a valid coin. Invalid coins are discharged from a coin payout exit.

The reverter 91 operates based on a control signal outputted from the main CPU 71, and distributes valid coins validated by the coin counter 92C into a hopper 113 or a cash box (not illustrated). That is, coins are distributed into the hopper 113 when the hopper 113 is not filled with coins, while coins are distributed into the cash box when the hopper 113 is filled with coins.

The cold cathode tube 93 functions as a backlight installed on the rear face sides of the upper image display panel 131 and the lower image display panel 141, and lights up based on a control signal outputted from the main CPU 71.

The body PCB 110 is connected with the lamp 111, the speakers 112A to 112D, the woofer 310, the hopper 113, a coin detecting portion 113S, the touch panel 114, the bill validator 115, a graphic board 130, the ticket printer 171, the card reader 172, a key switch 173S and the data display 174.

The lamp 111 lights up based on a control signal outputted from the main CPU 71. The speakers 112A to 112D and the woofer 310 configure 4.1-ch, based on a control signal outputted from the main CPU 71, and an effect is provided in such a manner that the sound image of an effect sound moves vertically or horizontally in accordance with the contents of an effect.

The hopper 113 operates based on a control signal outputted from the main CPU 71, and pays out coins of the specified number of payouts from the coin payout exit to the coin tray 15. The coin detecting portion 113S outputs a signal to the main CPU 71 upon detection of coins paid out by the hopper 113.

The touch panel 114 detects a place on the lower image display panel touched by the player's finger or the like, and outputs to the main CPU 71 a signal corresponding to the detected place. Upon acceptance of a valid bill, the bill validator 115 outputs to the main CPU 71 a signal corresponding to the face amount of the bill.

The graphic board 130 controls display of images conducted by the respective upper image display panel 131 and lower image display panel 141, based on a control signal outputted from the main CPU 71. The symbol display region 4 of the lower image display panel 141 displays the five video reels 3 by which the scrolling and stop motions of the symbol arrays included in the respective video reels 3 are displayed. The graphic board 130 is provided with a VDP generating image data, a video RAM temporarily storing the image data generated by the VDP, and the like.

A number-of-stocks display portion of the lower image display panel 141 displays the number S of stocks shown by the number-of-stocks data stored in the number-of-stocks storage area of the RAM 73. The lower image display panel 141 corresponds to the display of the present invention.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73. This game program also includes data concerning effect images or effect sounds, the contents of which are different depending on basic game construction times.

Based on a control signal outputted from the main CPU 71, the ticket printer 171 prints on a ticket a barcode representing encoded data of the number of credits stored in the RAM 73, date, the identification number of the gaming machine 1, and the like, and then outputs the ticket as the ticket with a barcode.

The card reader 172 reads data stored in a card inserted into the card slot and transmits the data to the main CPU 71, or writes data into the card based on a control signal outputted from the main CPU 71.

The key switch 173S is provided in the keypad, and outputs a predetermined signal to the main CPU 71 when the keypad has been operated by the player.

The data display 174 displays data read by the card reader 172 and data inputted by the player through the keypad, based on a control signal outputted from the main CPU 71.

[Configuration of Symbol Combination Table]

The description of the circuit construction of the gaming machine 1 has now been completed. Next, with reference to FIG. 12, a symbol combination table will be described. FIG. 12 is a view showing the symbol combination table of the gaming machine according to the embodiment.

A symbol combination table specifies symbol combinations of symbols according to winning prizes and the number of payouts. In the gaming machine 1, a winning prize is established in the case where scrolling of the symbol arrays of the respective video reels 3 is stopped and then a combination of symbols displayed on a winning line coincides with a combination of symbols which are specified according to the symbol combination table. A privilege such as payout of coins or start of bonus game is then given to a player according to a winning combination. Alternatively, in the case where a combination of symbols which are displayed on a winning line does not coincide with any combination of symbols which are displayed on a winning line according to the symbol combination table, no winning prize (a so called "losing") is established.

Basically, a winning prize is established in the case where all of the symbols displayed on a winning line according to the respective video reels 3 are arranged as a combination of symbols of one type from among "JACKPOT 7", "APPLE", "BLUE 7", "BELL", "CHERRY", "STRAWBERRY", "PLUM", and "ORANGE." However, with respect to symbols of types such as "CHERRY" and "ORANGE", a winning prize is established in the case where one or three symbols of either one type of them is or are displayed on a winning line according to the video reels 3 as well.

For example, in the case where symbols "BLUE 7" are arranged on a winning line according to all the video reels 3, a winning combination is realized as "BLUE" and then "10" is determined as the number of payouts. Coin payout is then performed based on the determined number of payouts. The above coin payout is performed by actually discharging coins from a coin payout exit, adding the number of coins to the number of credits, or issuing a barcode ticket.

"JACKPOT 7" is a symbol to be associated with a jackpot trigger. In the case where "JACKPOT 7" symbols are displayed to be arranged on a winning line according to all the video reels 3, a winning prize is realized as a "jackpot" and then the amount of jackpot is determined as the number of payouts.

"APPLE" is a symbol to be associated with a bonus trigger. In the case where "APPLE" symbols are displayed to be arranged on a winning line according to all the video reels 3, the number of winning prizes is realized as a "bonus game", the corresponding bonus game is started from a next time of play.

[Contents of Program]

The determination of the symbols combination table has been described above. Next, with reference to FIGS. 13 to 26, the program to be executed by the gaming machine 1 is described.

<Main Control Processing>

Figure 13:
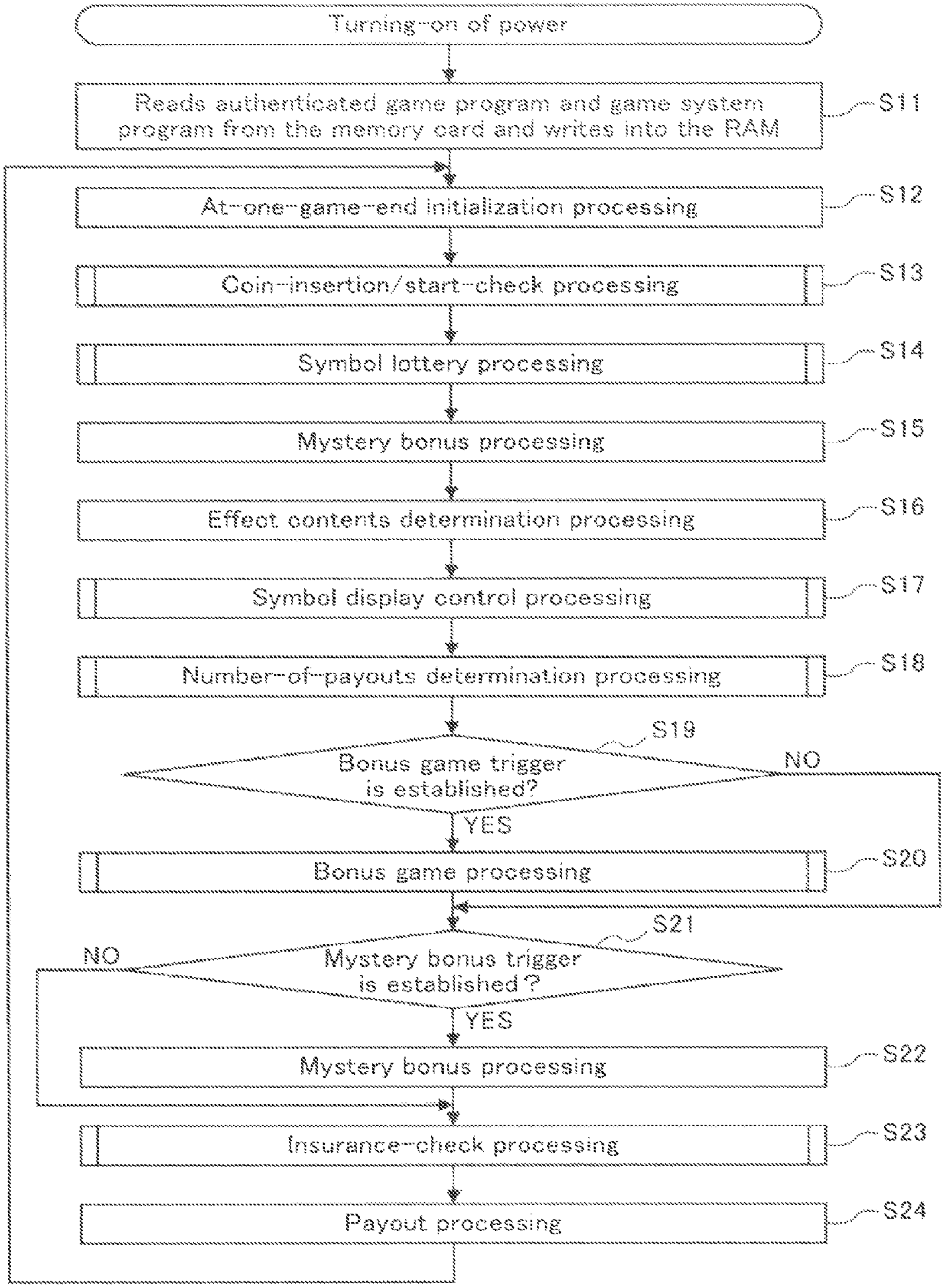
FIG. 13 is a flowchart showing main control processing in the gaming machine according to the embodiment of the present invention.

First, with reference to FIG. 13, main control processing is described. FIG. 13 is a view illustrating a flowchart of the main control processing for the gaming machine according to the embodiment of the present invention.

First, when the power is supplied to the gaming machine 1, the main CPU 71 reads the authenticated game program and game system program from the memory card 54 through the gaming board 50, and writes the programs into the RAM 73 (step S11).

Next, the main CPU 71 conducts at-one-game-end initialization processing (step S12). For example, data that becomes unnecessary after each game in the working areas of the RAM 73, such as the number of BETs and the symbols determined by lottery, is cleared.

The main CPU 71 conducts coin-insertion/start-check processing which is described later with reference to FIG. 15 (step S13). In the processing, input from the BET switch and the spin switch is checked.

The main CPU 71 then conducts symbol lottery processing which is described later with reference to FIG. 18 (step S14). In the processing, to-be stopped symbols are determined based on the symbol table for normal game and the random values for symbol determination.

Next, the main CPU 71 conducts mystery bonus lottery processing (step S15). In the processing, lottery determining whether or not to establish a mystery bonus trigger is held. For example, the main CPU 71 extracts a random value for mystery bonus from the numbers in a range of "0 to 99", and establishes the mystery bonus trigger when the extracted random value is "0".

The main CPU 71 conducts effect contents determination processing (step S16). The main CPU 71 extracts a random value for effect, and determines any of the effect contents from the preset plurality of effect contents by lottery. In the case where different effect images are displayed while in basic game depending on when a basic game is executed in the first consumption time and when it is executed in the second consumption time, the effect images that are determined by means of lottery in the contents-of-effect determination processing will be different depending on when the basic game is executed in the first consumption time and when it is executed in the second consumption time.

The main CPU 71 then conducts symbol display control processing which is described later with reference to FIG. 19 (step S17). In the processing, scrolling of the symbol array of each video reel 3 is started, and the to-be stopped symbol determined in the symbol lottery processing of step S14 is stopped at a predetermined position (e.g. the upper region in the symbol display region 4). That is, four symbols including the to-be stopped symbol are displayed in the symbol display region 4. For example, when the to-be stopped symbol is the symbol associated with the code number of "10" and it is to be displayed to the upper region, the symbols associated with the respective code numbers of "11", "12" are to be displayed to the respective central region and lower region in the symbol display region 4.

Next, the main CPU 71 conducts number-of-payouts determination processing to be described later with reference to FIG. 20 (step S18). In this processing, the number of payouts is determined based on a combination of symbols that are displayed on a winning line and then the determined number of payouts is stored in a number-of-payouts storage area that is provided in the RAM 73.

Next, the main CPU 71 determines whether or not a bonus game trigger has been established (step S19). When the main CPU 71 determines that the bonus game trigger has been established, the main CPU 71 conducts bonus game processing to be described later with reference to FIG. 22 (step S20). Next, after the processing of step S20 or when determining in step S19 that the bonus game trigger has not been established, the main CPU 71 then determines whether or not a mystery bonus trigger has been established (step S21). When the main CPU 71 determines that the mystery bonus trigger has been established, the main CPU 71 conducts mystery bonus processing (step S22). In this processing, the number of payouts (for example, 300) that is set for mystery bonus is stored in the number-of-payouts storage area that is provided in the RAM 73.

After the processing of step S22 or when determining in step S21 that the mystery bonus trigger has not been established, the main CPU 71 conducts insurance-check processing which is described later with reference to FIG. 21 (step S23). In the processing, whether or not to conduct payout by the insurance is checked.

The main CPU 71 conducts payout processing (step S24). The main CPU 71 adds the value stored in the number-of-payouts storage area to a number-of-credits storage area provided in the RAM 73. It is to be noted that operations of the hopper 113 may be controlled based on input from the CASH-OUT switch 33S, and coins of the number corresponding to the value stored in the number-of-payouts storage area may be discharged from the coin payout exit. Further, operations of the ticket printer may be controlled and a ticket with a barcode may be issued on which a value stored in the number-of-payouts storage area is recorded. After the processing has been conducted, the processing is shifted to step S12.

<At-One-Game-End Initialization Processing>

Figure 14:
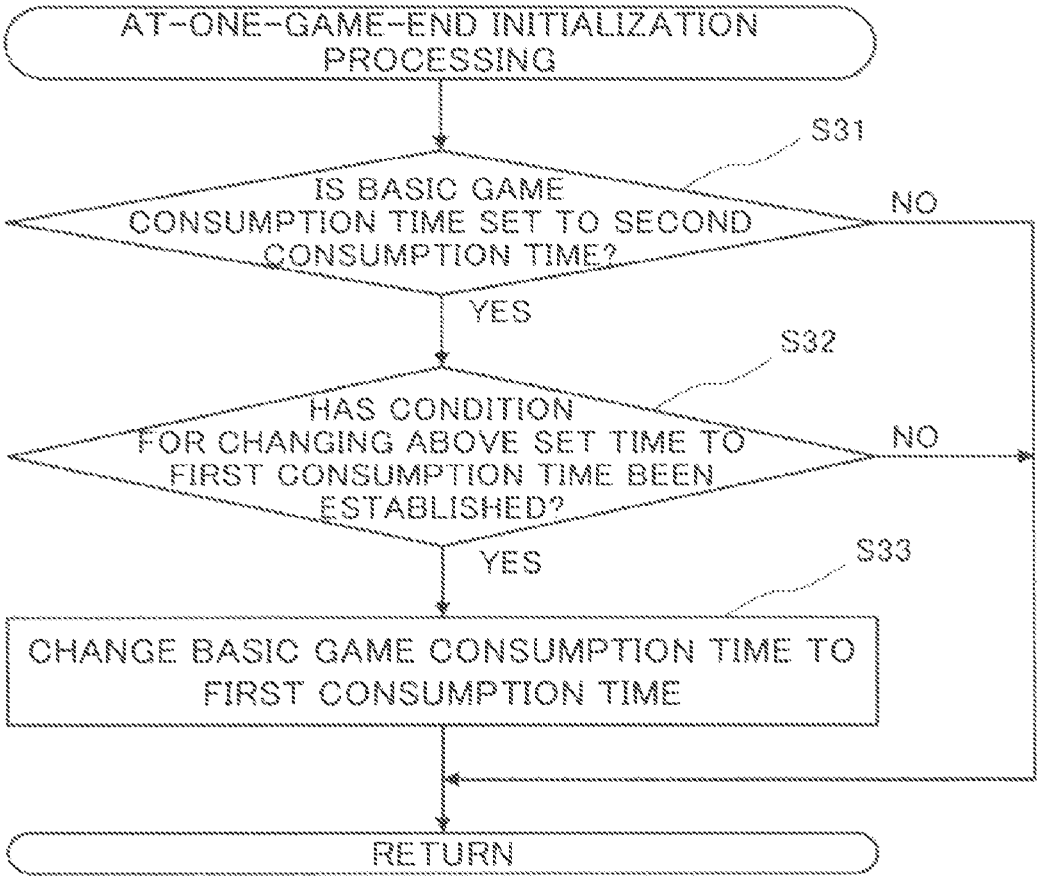
FIG. 14 is a flowchart showing at-one-game-end initialization processing in the gaming machine according to the embodiment of the present invention.

Next, with reference to FIG. 14, at-one-game-end initialization processing in step S12 of FIG. 13 will be described. FIG. 14 is a view showing a flowchart of at-one-game-end initialization processing in the gaming machine 1 according to the embodiment.

First, the main CPU 71 determines whether or not a basic game consumption time is set to a second consumption time (step S31). When the main CPU 71 determines that the above time is not set to the second consumption time, the main CPU 71 completes at-one-game-end initialization processing. Alternatively, when the main CPU 71 determines that the time is set to the second consumption time, the main CPU 71 determines whether or not there has been established a condition for switching a basic game mode from the second consumption time to a first consumption time (step S32).

For example, this condition is established if the main CPU 71 detects an operation of a mode change button 37 or if the main CPU 71 detects that a unitary game in the gaming machine 1 is not continuously executed for a predetermined period of time. When the main CPU 71 determines that the condition has not been established, the main CPU 71 completes at-one-game-end initialization processing. Alternatively, when the main CPU 71 determines that the condition has been established, the main CPU 71 changes the basic game consumption time from the second consumption time to the first consumption time (step S33). After this processing has been completed, the main CPU 71 completes at-one-game-end initialization processing.

<Coin-Insertion/Start-Check Processing>

Figure 15:
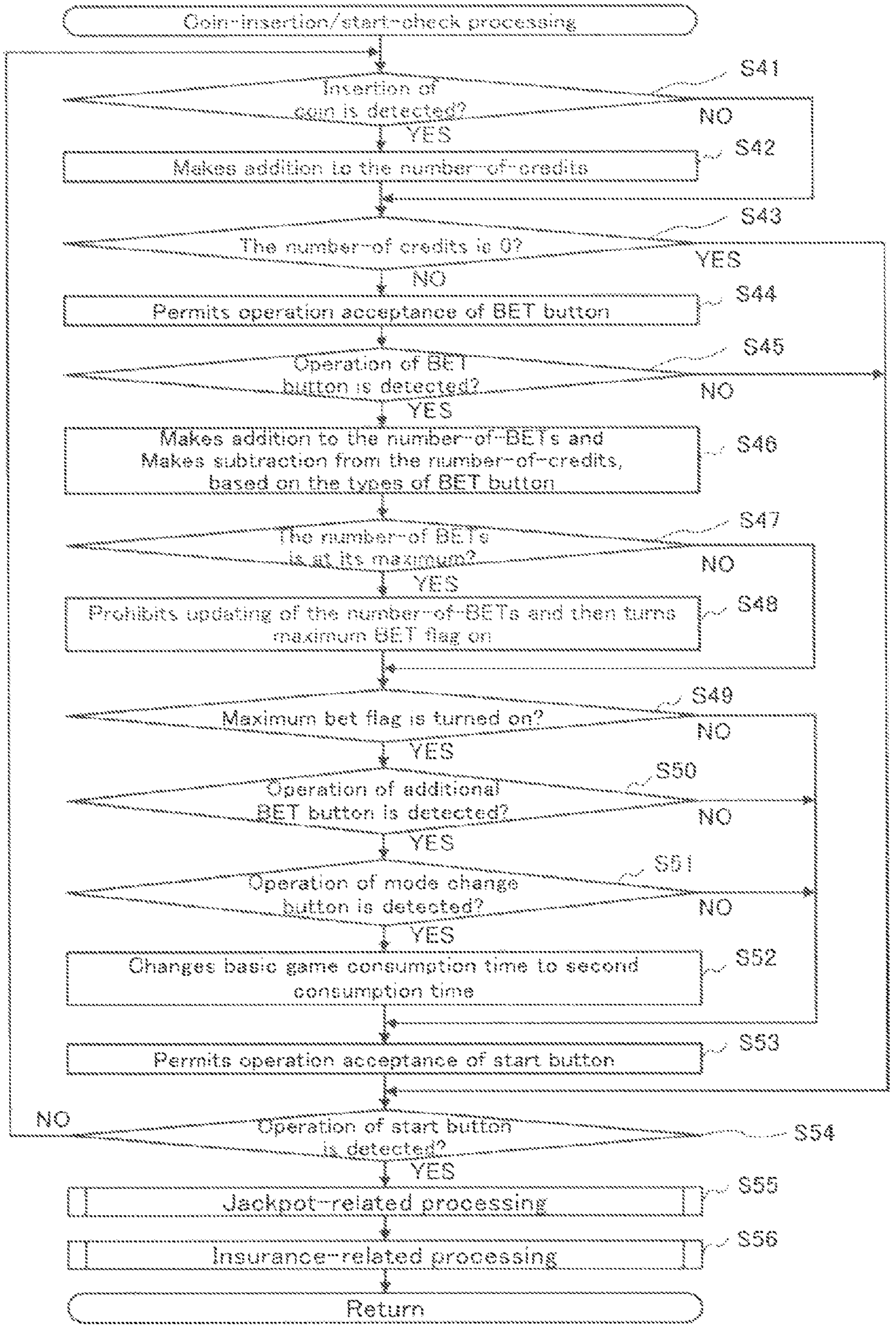
FIG. 15 is a flowchart showing coin insertion/start check processing in the gaming machine according to the embodiment of the present invention.

Next, with reference to FIG. 15, coin-insertion/start-check processing is described. FIG. 15 is a view illustrating a flowchart of the coin-insertion/start-check processing for the gaming machine according to the embodiment of the present invention.

First, the main CPU 71 determines whether or not insertion of a coin has been detected by the coin counter 92C (step S41). When determining that the insertion of a coin has been detected, the main CPU 71 makes an addition to the number-of-credits counter (step S42). It is to be noted that, in addition to the insertion of a coin, the main CPU 71 may determine whether or not insertion of a bill has been detected by the bill validator 115, and when determining that the insertion of a bill has been detected, the main CPU 71 may add a value according to the bill to the number-of-credits counter.

After step S42 or when determining in step S41 that the insertion of a coin has not been detected, the main CPU 71 determines whether or not the number-of-credits counter is zero (step S43). When the main CPU 71 determines that the number-of-credits counter is not zero, the main CPU 71 permits operation acceptance of the BET buttons (step S44).

Next, the main CPU 71 determines whether or not operation of any of the BET buttons has been detected (step S45). When the main CPU 71 determines that the BET switch (1-BET switch 34S, MAX-BET switch 35S) has detected press of the BET button by the player, the main CPU 71 makes an addition to a number-of-BETs counter provided in the RAM 73 and makes a subtraction from the number-of-credits counter, based on the type of the BET button (step S46).

Next, the main CPU 71 determines whether or not a value stored in a number-of-BETs storage area is set to a maximum value (step S47). When the main CPU 71 determines that the value stored in the number-of-BETs storage area is the maximum, the main CPU 71 disallows for updating of the value stored in the number-of-BETs storage area and then turns on a maximum BET flag (step S48). After the processing of step S48 or when determining in step S47 that the value stored in the number-of-BETs is not set to the maximum value, the main CPU 71 determines whether or not the maximum BET flag is turned on (step S49).

When the main CPU 71 determines that the maximum BET flag is turned on, the main CPU 71 determines whether or not an operation of an additional BET button 38 has been detected (step S50). When the main CPU 71 detects, by means of an additional switch 38S, that the additional BET button 38 has been pressed by a player, the main CPU 71 determines whether or not an operation of a mode change button 37 has been detected (step S51).

When the main CPU 71 detects, by means of a mode change switch 37S, that the mode change button 37 has been pressed by the player, the main CPU 71 changes the basic game consumption time from the first consumption time to the second consumption time (step S52). After the processing of step S52, when the main CPU 71 determines that the maximum BET flag is not turned on in step S49, when the main CPU 71 determines that the maximum BET flag is not turned on in step S50, or alternatively, when the main CPU 71 determines that the operation of the mode change button 37 has not been detected in step S51, the main CPU 71 allows for acceptance of an operation of a start button 31 (step S53).

After the processing of step S53, when the main CPU 71 determines that an operation of a BET button has not been detected in step S45, or alternatively, when the main CPU 71 determines that the value stored in a number-of-credits storage area in step S43 is set to 0, the main CPU 71 determines whether or not the operation of the start button 31 has been detected (step S54). When the main CPU 71 determines that the operation of the start button 31 has not been detected, the routine reverts to step S41.

Next, when the main CPU 71 determines that the operation of the start button 31 has been detected, the main CPU 71 conducts jackpot-related processing to be described later with reference to FIG. 16 (step S55). In this processing, the amount accumulated on the amount of jackpot is computed and then the computed amount is transmitted to an external control device 200.

The main CPU 71 then conducts insurance-related processing to be described later with reference to FIG. 17 (step S56). In this processing, the number of times of playing game is counted as a trigger for a case in which the payout according to insurance is performed. After this processing has been conducted, coin insertion/start check processing is completed.

<Jackpot-Related Processing>

Figure 16:
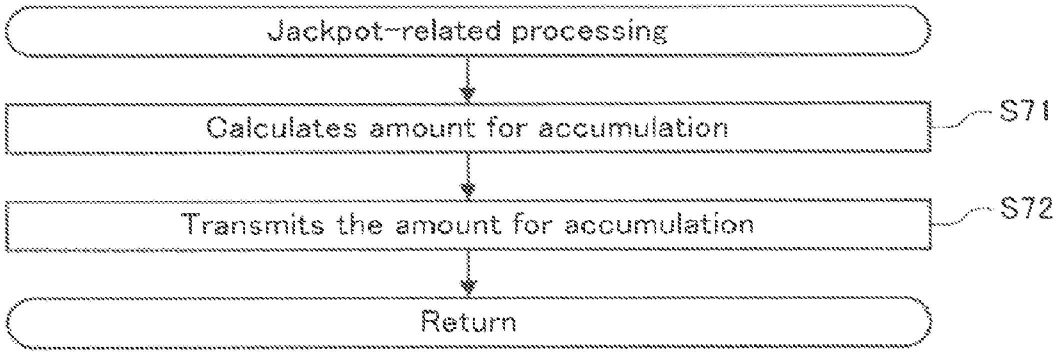
FIG. 16 is a flowchart showing jackpot-related processing in the gaming machine according to the embodiment of the present invention.

Next, with reference to FIG. 16, the jackpot-related processing in the step S55 of FIG. 15 is described. FIG. 16 is a view illustrating a flowchart of the jackpot-related processing for the gaming machine according to the embodiment of the present invention.

First, the main CPU 71 calculates the amount for accumulation (step S71). The main CPU 71 obtains the product of the value of the number-of-BETs counter and a preset accumulation ratio, so that the amount for accumulation to the amount of jackpot is calculated.

Next, the main CPU 71 transmits the calculated amount for accumulation to the external control device 200 (step S72). Upon reception of the amount for accumulation, the external control device 200 updates the amount of jackpot. After the processing has been conducted, the jackpot-related processing is completed.

<Insurance-Related Processing>

Figure 17:
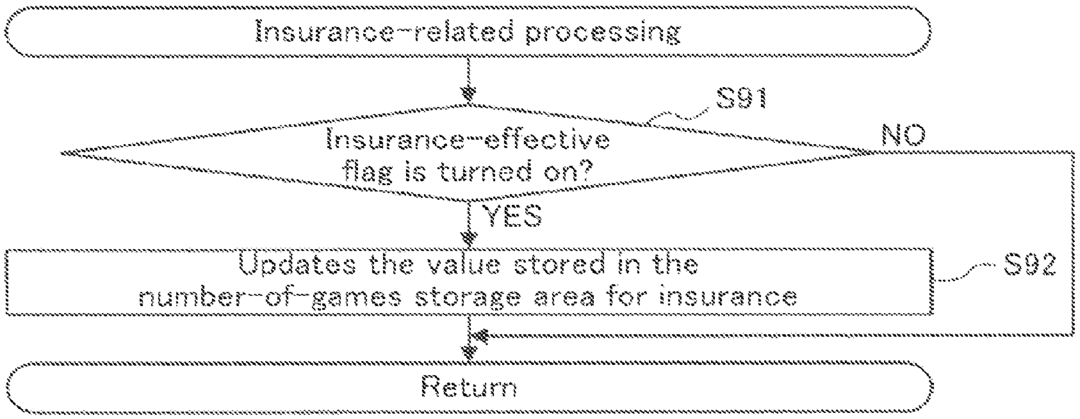
FIG. 17 is a flowchart showing insurance-related processing in the gaming machine according to the embodiment of the present invention.

Next, with reference to FIG. 17, the insurance-related processing in the step S56 of FIG. 15 is described. FIG. 17 is a view illustrating a flowchart of the insurance-related processing for the gaming machine according to the embodiment of the present invention.

First, the main CPU 71 determines whether or not an insurance-effective flag is turned on (step S91). The insurance-effective flag is turned on when a command to make the insurance effective is inputted by the player in the insurance selection processing which is described later with reference to FIG. 26.

When the main CPU 71 determines that the insurance-effective flag is not turned on, the main CPU 71 completes the insurance-related processing. On the other hand, when the main CPU 71 determines that the insurance-effective flag is turned on, the main CPU 71 updates a value stored in a number-of-games storage area for insurance provided in the RAM 73 (step S92). The number-of-games storage area for insurance is a counter for managing the number of games up to the time of the payout by the insurance. In the processing of step S92, the main CPU 71 adds one to the number-of-games storage area for insurance. After the processing has been conducted, the insurance-related processing is completed.

<Symbol Lottery Processing>

Next, with reference to FIG. 18, the symbol lottery processing is described. FIG. 18 is a view illustrating a flowchart of the symbol lottery processing for the gaming machine according to the embodiment of the present invention.

First, the main CPU 71 extracts random values for symbol determination (step S111). The main CPU 71 then determines to-be stopped symbols for the respective video reels 3 by lottery (step S112). The main CPU 71 holds a lottery for each video reel 3, and determines any one of the 22 symbols (code numbers from "00" to "21") as a to-be stopped symbol.

In the case where a current basic game consumption time is set to a first consumption time, the main CPU 71 determines to-be stopped symbols of the respective video reels 3 by using a lottery table which corresponds to a first payout rate. In the case where the current basic game consumption time is set to a second consumption time, the main CPU 71 determines to-be stopped symbols of the respective video reels 3 by using a lottery table which corresponds to a second payout rate.

The main CPU 71 then stores the determined to-be stopped symbols for the respective video reels 3 into a symbol storage area provided in the RAM 73 (step S113). Next, the main CPU 71 references the symbol combination table (FIG. 12) and determines a winning combination based on the symbol storage area (step S114). The main CPU 71 determines the winning combination based on the combination of symbols to be displayed along the winning line by the respective video reels 3 and the symbol combination table. After the processing has been conducted, the symbol lottery processing is completed.

<Symbol Display Control Processing>

Figure 19:
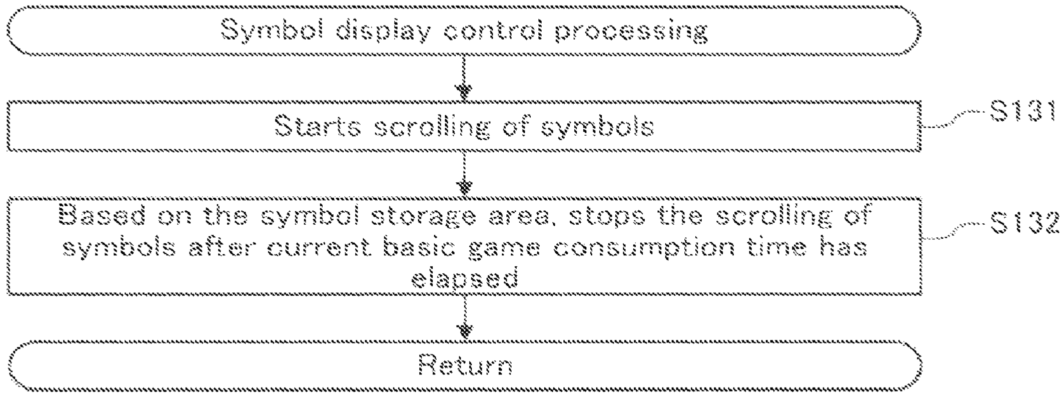
FIG. 19 is a flowchart showing symbol display control processing in the gaming machine according to the embodiment of the present invention.

Next, with reference to FIG. 19, the symbol display control processing is described. FIG. 19 is a view illustrating a flowchart of the symbol display control processing for the gaming machine according to the embodiment of the present invention.

First, the main CPU 71 starts scrolling of the symbol arrays of the respective video reels 3 that are displayed to the symbol display region 4 of the lower image display panel 141 (step S131). The main CPU 71 then stops the scrolling of the symbol arrays of the respective video reels 3, based on the aforementioned symbol storage area (step S132). After the processing has been conducted, the symbol display control processing is completed.

In the case where the current basic game consumption time is the first consumption time, the main CPU 71 stops scrolling after the first consumption time has elapsed subsequent to starting scrolling of the symbol arrays of the respective video reels 3. In the case where the current basic game consumption time is set to the second consumption time, the main CPU 71 stops scrolling after the second consumption time has elapsed subsequent to starting scrolling of the symbol arrays of the respective video reels 3. After this processing has been conducted, symbol display control processing is completed.

<Number-of-Payouts Determination Processing>

Figure 20:
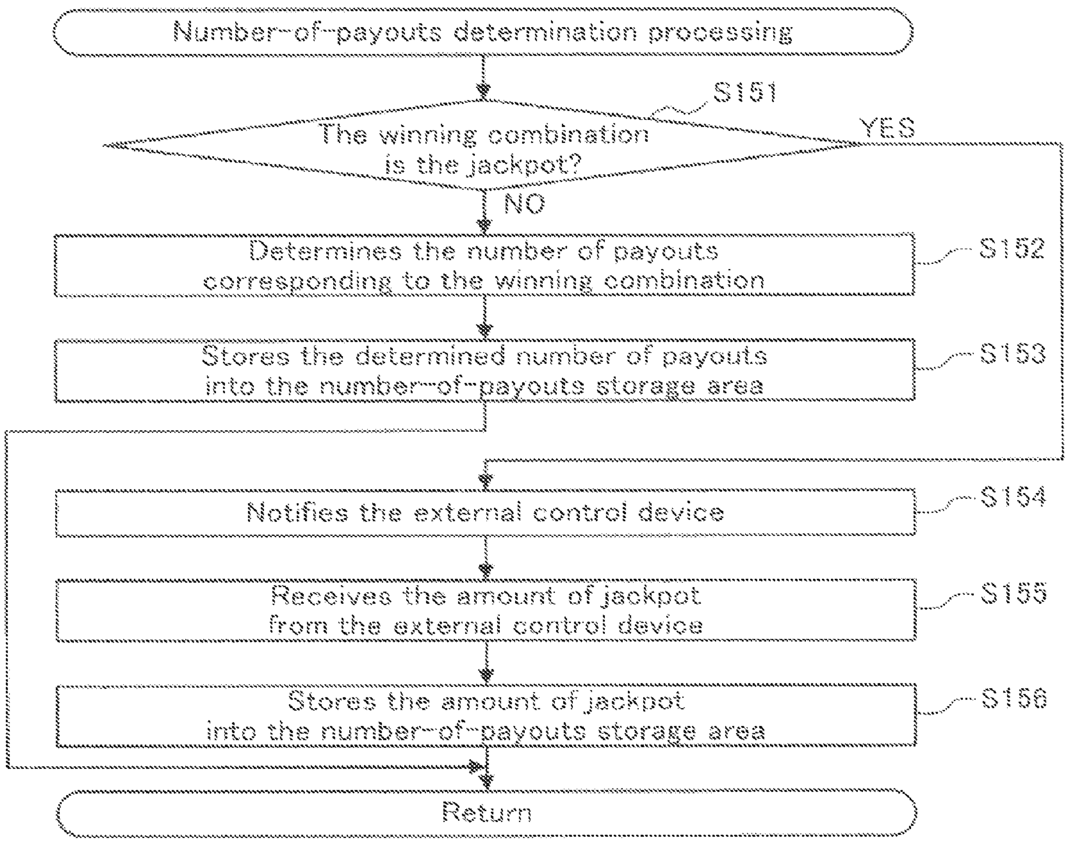
FIG. 20 is a flowchart showing number-of-payouts determination processing in the gaming machine according to the embodiment of the present invention.

Next, with reference to FIG. 20, the number-of-payouts determination processing is described. FIG. 20 is a view illustrating a flowchart of the number-of-payouts determination processing for the gaming machine according to the embodiment of the present invention.

First, the main CPU 71 determines whether or not the winning combination is the jackpot (step S151). When the main CPU 71 determines that the winning combination is not the jackpot, the main CPU 71 determines the number of payouts corresponding to the winning combination (step S152). For example, the main CPU 71 determines "8" as the number of payouts in the case where the winning combination is "BELL" (with reference to FIG. 12). It is to be noted that the main CPU 71 determines "0" as the number of payouts in the case where the game is lost. Next, the main CPU 71 stores the determined number of payouts into the number-of-payouts storage area (step S153). After the processing has been conducted, the number-of-payouts determination processing is completed.

When the main CPU 71 determines that the winning combination is the jackpot, the main CPU 71 notifies the external control device 200 of the winning of the jackpot (step S154). It is to be noted that, upon reception of the notification, the external control device 200 transmits to the gaming machine 1 the amount of jackpot having updated up to that time. At this time, a part (e.g. 80%) of the amount of jackpot may be the payout subject and the rest (e.g. 20%) may be carried over for the upcoming establishment of the jackpot trigger.

Next, the main CPU 71 receives the amount of jackpot from the external control device 200 (step S155). The main CPU 71 then stores the received amount of jackpot into the number-of-payouts counter (step S156). After the processing has been conducted, the number-of-payouts determination processing is completed.

<Insurance-Check Processing>

Figure 21:
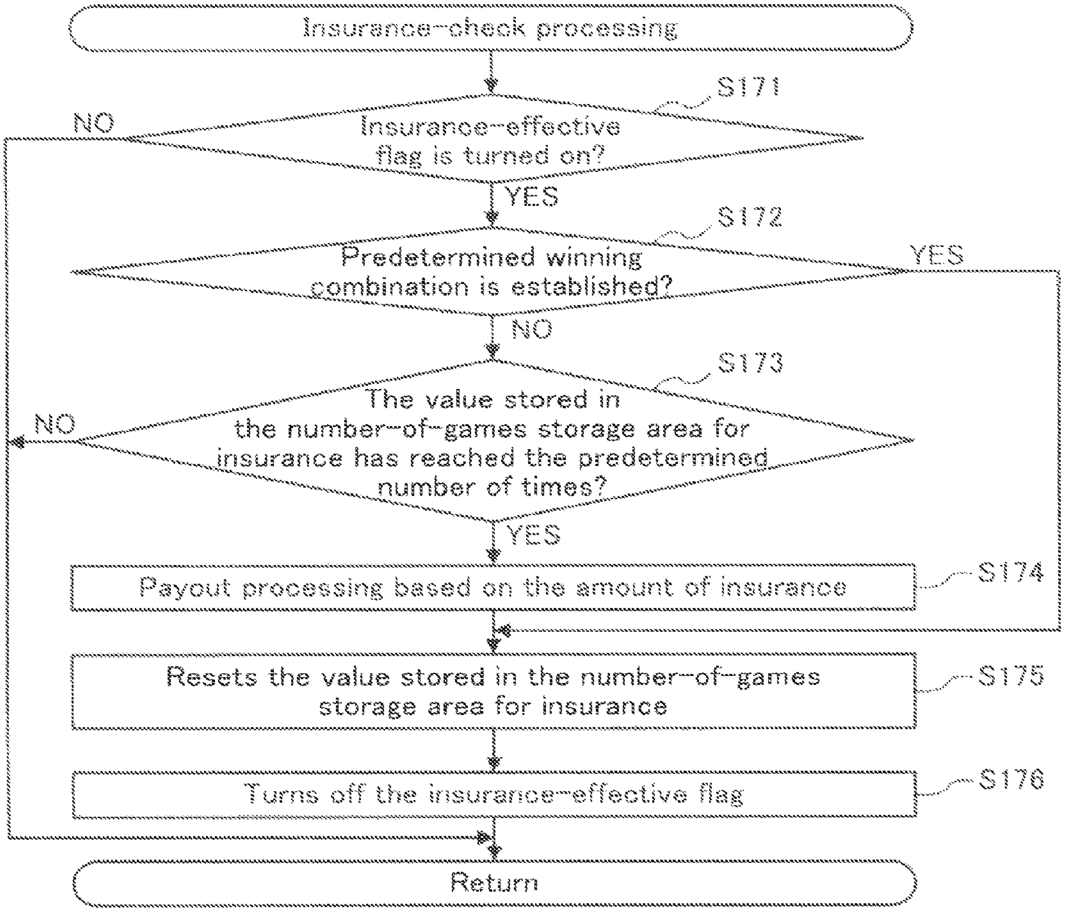
FIG. 21 is a flowchart showing insurance check processing in the gaming machine according to the embodiment of the present invention.

Next, with reference to FIG. 21, the insurance-check processing is described. FIG. 21 is a view illustrating a flowchart of the insurance-check processing for the gaming machine according to the embodiment of the present invention.

First, the main CPU 71 determines whether or not the insurance-effective flag is turned on (step S171). When the main CPU 71 determines that the insurance-effective flag is not turned on, the main CPU 71 completes the insurance-check processing.

When the main CPU 71 determines that the insurance-effective flag is turned on, the main CPU 71 determines whether or not a predetermined winning combination has been established (step S172). In the present embodiment, "free game trigger", "jackpot" and "mystery bonus" are subjects of the predetermined winning combination.

When the main CPU 71 determines that a predetermined winning combination has not been established, the main CPU 71 determines whether or not the value stored in a number-of-games storage area for insurance has reached a predetermined number of times (for example, 300) (step S173). When the main CPU 71 determines that the value stored in the number-of-games storage area for insurance has not reached the predetermined number of times, the main CPU 71 completes insurance check processing.

When the main CPU 71 determines that the value stored in the number-of-games storage area for insurance has reached the predetermined number of times, the main CPU 71 conducts payout processing based on the amount of insurance (step S174). The main CPU 71 adds a predetermined value (for example, 200) as the amount of insurance in the number-of-credits storage area.

After the processing of step S174 or when determining in step S172 that a predetermined winning combination has been established, the main CPU 71 resets the value stored in the number-of-games storage area for insurance (step S175). Next, the main CPU 71 turns off an insurance-effective flag (step S176). After this processing has been conducted, insurance check processing is completed.

<Bonus Game Execution Processing>

Figure 22:
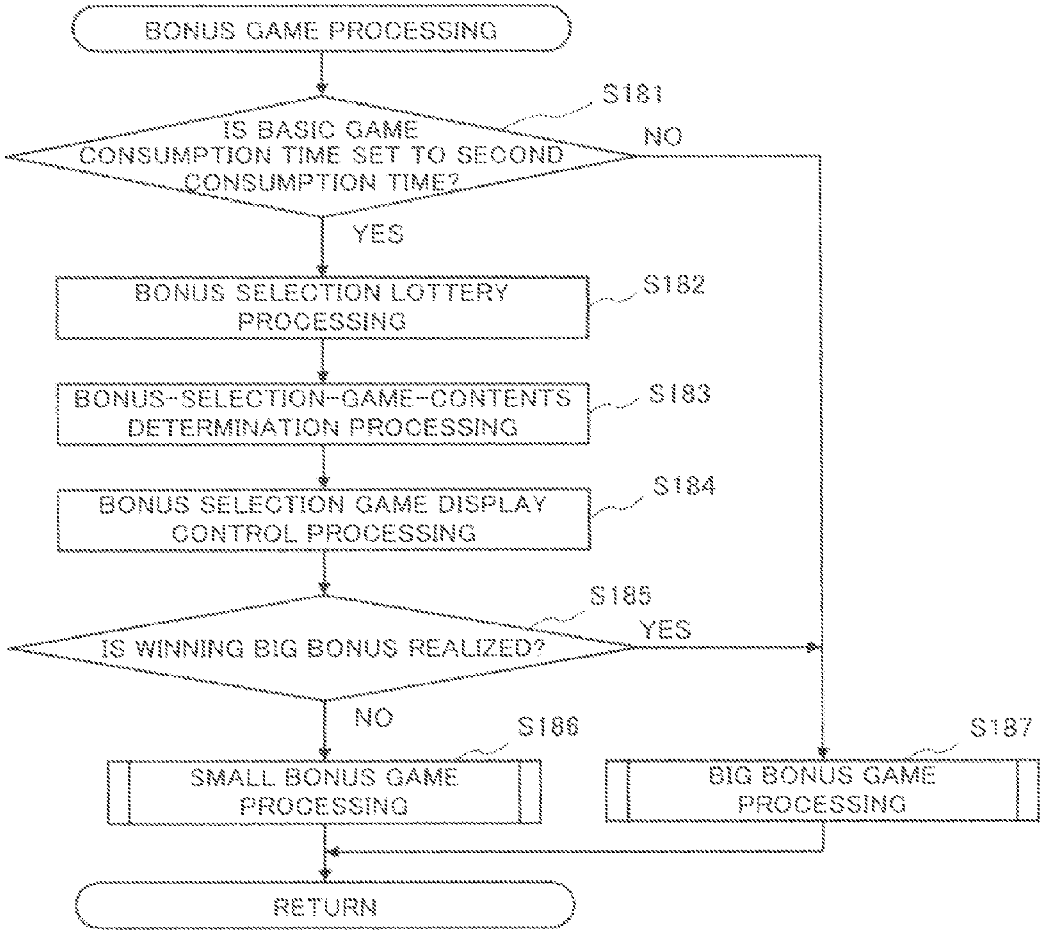
FIG. 22 is a flowchart showing bonus game processing in the gaming machine according to the embodiment of the present invention.

Next, with reference to FIG. 22, bonus game processing in step S20 of FIG. 13 will be described. FIG. 22 is a view showing a flowchart of bonus game processing in the gaming machine according to the embodiment of the present invention.

First, the main CPU 71 determines whether or not a basic game consumption time is set to a second consumption time (step S181). When the main CPU 71 determines that the above time is set to the second consumption time, the main CPU 71 conducts bonus selection lottery processing of determining whether a bonus game is set to a big bonus or a small bonus by means of lottery (step S182).

Next, the main CPU 71 conducts bonus-selection-game-content determination processing (step S183). In this processing, the contents of a bonus selection game is determined based on the contents of selection result of a bonus (a big bonus or a small bonus) that is determined by means of lottery in the bonus selection lottery processing of step S182. Next, the main CPU 71 conducts bonus selection game display control processing of displaying the contents of the bonus selection game that is determined in the processing of step S183 on the lower image display panel 141 (step S184).

Next, the main CPU 71 then determines whether or not the bonus determined by means of lottery is set to a large bonus in the bonus selection lottery processing of step S182 (step S185). When the main CPU 71 determines that the determined bonus is not set to the large bonus, the main CPU 71 conducts small bonus game processing to be described later with reference to FIG. 23 (step S186). After this processing has been conducted, bonus game processing is completed.

Figure 24:
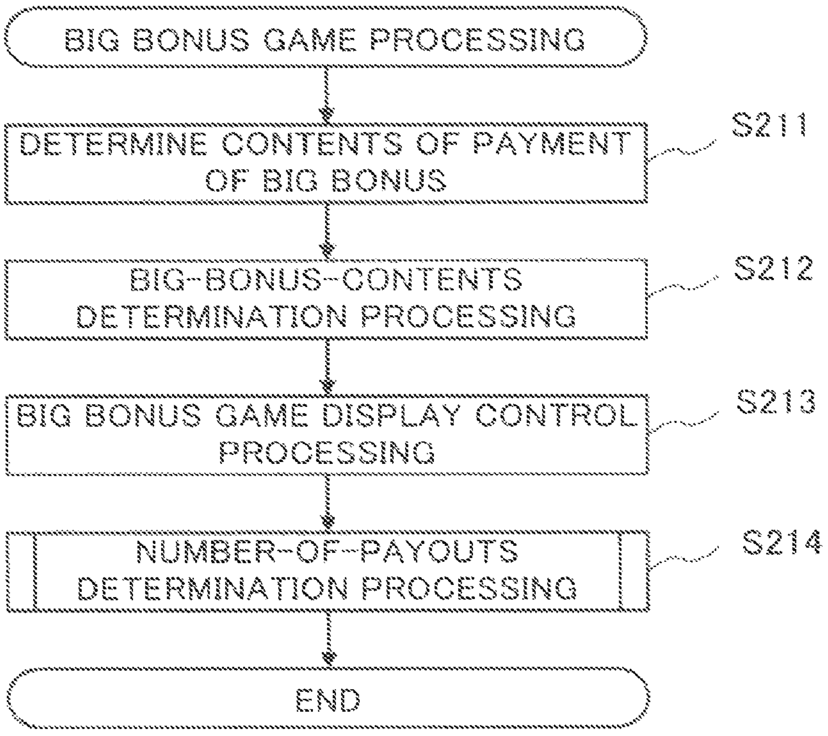
FIG. 24 is a flowchart showing big bonus game processing in the gaming machine according to the embodiment of the present invention.

Alternatively, when the main CPU 71 determines that the second consumption time is not established in step S181 and when the main CPU 71 determines that the big bonus is established in step S185, the main CPU 71 conducts big bonus game processing to be described later with reference to FIG. 24 (step S187). After this processing has been conducted, bonus game processing is completed.

<Small Bonus Game Processing>

Figure 23:
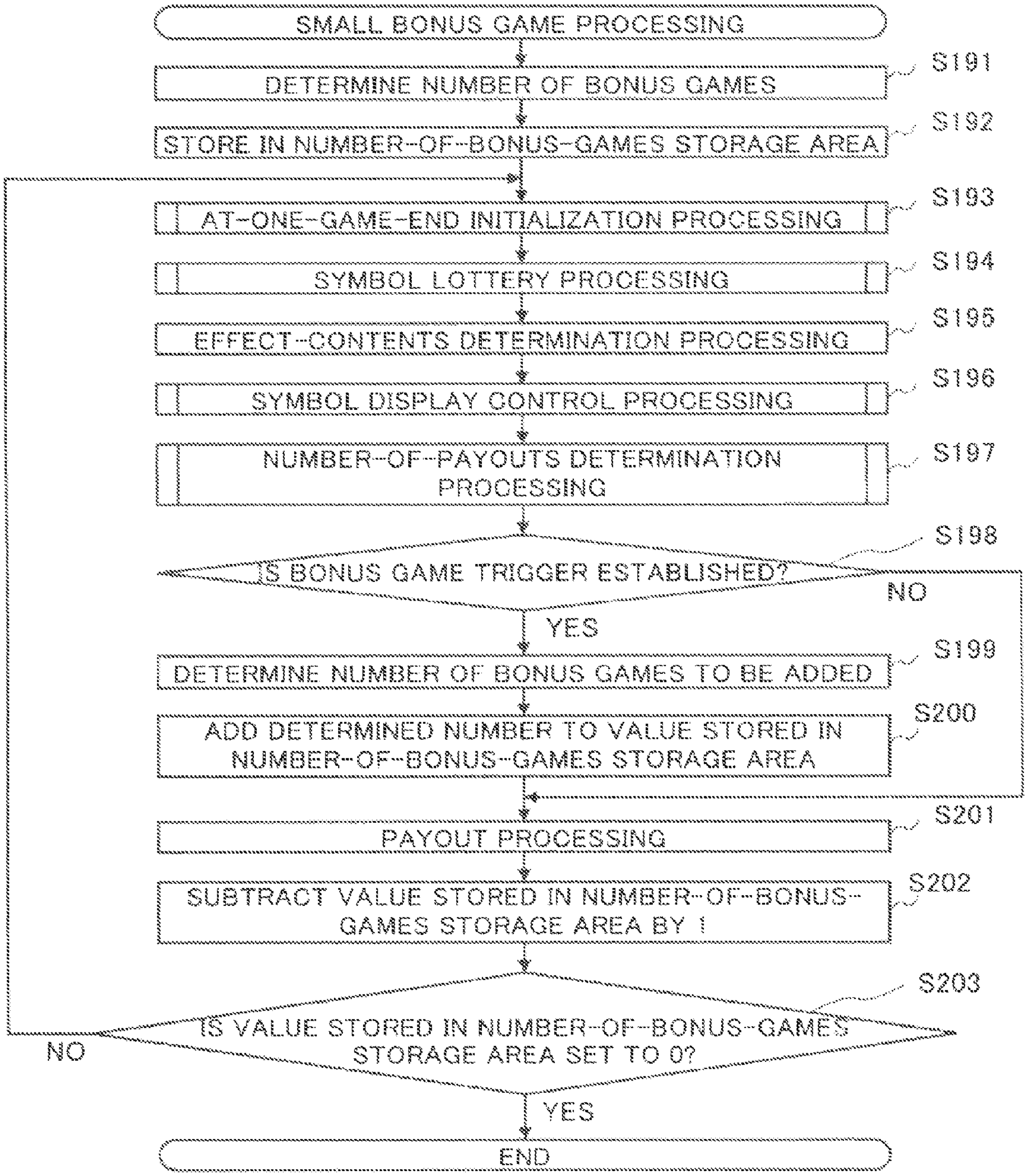
FIG. 23 is a flowchart showing bonus game processing in the gaming machine according to the embodiment of the present invention.

Next, with reference to FIG. 23, small bonus game processing in step S186 of FIG. 22 will be described. FIG. 23 is a flowchart of small bonus game processing in the gaming machine according to the embodiment of the present invention.

First, the main CPU 71 determines the number of bonus games (step S191). The main CPU 71 extracts a random number value for determining the number of bonus games and then determines any of a plurality of bonus games such as "50", "70", and "100", for example, by means of lottery.

Next, the main CPU 71 stores the determined number of bonus games in a number-of-bonus-games storage area which is provided in a RAM 73 (step S192).

Next, the main CPU 71 executing at-one-game-end initialization processing, in like the processing of step S12 described with reference to FIG. 13 (step S193). Next, the main CPU 71 conducts symbol lottery processing described with reference to FIG. 18 (step S194). Next, the main CPU 71 executing effect-contents determination processing in like the processing of step S16 described with reference to FIG. 13 (step S195). Next, the main CPU 71 then conducts symbol display control processing described with reference to FIG. 19 (step S196). Next, the main CPU 71 then conducts number-of-payouts determination processing described with reference to FIG. 20 (step S197).

Next, the main CPU 71 determines whether or not a bonus game trigger has been established (step S198). When the main CPU 71 determines that the bonus game trigger has been established, the main CPU 71 determines the number of bonus games to be added (step S199). This determination is made in a manner which is similar to that in the processing of step S191 described previously. Next, the main CPU 71 adds the determined number of additional bonus games to the value stored in the number-of-bonus-games storage area (step S200).

After the processing of step S200 or when determining in step S198 that the bonus game trigger has not established, the main CPU 71 conducts payout processing (step S201). In this payout processing, the main CPU 71 adds the value stored in the number-of-payouts storage area in the number-of-payouts determination processing of step S197 described previously to the value stored in a number-of-payouts storage area for bonus. The number-of-payouts storage area for bonus is directed to an area that stores a total number of payouts determined in bonus game.

After small bonus game has completed, the main CPU 71 adds the value stored in the number-of-payouts storage area for bonus to the value stored in the number-of-credits storage area that is provided in the RAM 73, during the payout processing of step S24 described with reference to FIG. 13. Namely, a total number of payouts that are determined in a bonus game for small bonus are paid out in bulk. Coins may be discharged from a coin payout exit or a barcode-attached ticket may be issued.

Next, the main CPU 71 subtracts the value stored in the number-of-bonus-games storage area by 1 (step S202). The main CPU 71 then determines whether or not the value stored in the number-of-bonus-game storage area is set to 0 (step S203). When the main CPU 71 determines that the value stored in the number-of-bonus-games storage area is not set to 0, the routine reverts to step S193. Alternatively, when the main CPU 71 determines that the value stored in the number-of-bonus-games storage area is set to 0, small bonus game processing is completed. After the small bonus game has been has been completed, the routine reverts to step S21 described with reference to FIG. 13.

<Big Bonus Game Processing>

Next, with reference to FIG. 24, big bonus game processing in step S187 of FIG. 22 will be described. FIG. 24 is a view showing a flowchart of big bonus game processing in the gaming machine according to the embodiment of the present invention.

First, the main CPU 71 determines the contents of payment of big bonus (step S211). The main CPU 71 extracts three random number values for determining a payment of big bonus. These random number values correspond to three values to be selected by a player operation in a bonus game for big bonus.

In step S211, as described above with reference to FIG. 6, the main CPU 71 determines three values (the number of step-ups or the number of advanced frames) to be acquired when a bonus game for big bonus is played. In step S211, on the basis of the determined three values, the main CPU 71 determines a payment of big bonus as a winning combination which is realized according to a big bonus game.

Next, the main CPU 71 conducts big-bonus-contents determination processing (step S212). In this processing, the contents of big bonus game are determined based on the contents of a selection result of the three values (the number of step-ups or the number of advanced frames) that are determined by means of lottery in the processing of step S211. Next, the main CPU 71 conducts big bonus display control processing of displaying the contents of a big bonus game that is determined in the processing of step S212 on the lower image display panel 141 (step S213). In this processing, as shown in FIG. 6, a display effect according to the number of step-ups in response to the determined payment is provided by means of seven-segment LEDs 301A to 301E (FIG. 3) of the upper effect portion 131, and by means of an effect exerted by means of the light, an effect exerted by means of effect sounds from the speakers 112A to 112D (FIG. 3) and the woofer 310 is executed. That is, a sound image of effect sounds is controlled in such a manner that it is audible as if the generation sources of effect sounds were moving from downward to upward similarly with upward movement of the light (rising of a light emitting area toward an eruptive crater of a volcano). In this case, effect sounds to be outputted from the respective speakers 112A to 112D is controlled by means of phase and/or volume control to an extent such that, among a plurality of seven-segment LEDs 301A to 301E, data concerning a sound image according to the position of a seven-segment LED (that is, a light emitting seven-segment LED) is read out from a table which is stored in advance in the RAM 73 (FIG. 25) and then the sound image is reproduced. For example, if the lower three of the seven-segment LEDs 301A to 301C are selected according to the determined payment, control is performed in such a manner that it is audible as if the sound images that are sequentially reproduced by means of the speakers 112A to 112D were rising from the seven-segment LED 301A at the lowest position to the seven-segment LED 301C at the third position. In this manner, an effect can be provided in such a manner that a direction in which an effect sound is audible also rises, as the light rises. By means of such a sound effect, the attention of a player, which has been paid to the video reels 3, can be drawn to the upper effect portion 131 that is provided upward.

Next, the main CPU 71 conducts number-of-payouts determination processing described with reference to FIG. 20 (step S214). After this processing has been conducted, big bonus processing is completed. After big bonus game has been completed, the routine reverts to step S21 described with reference to FIG. 13.

<Insurance Selection Processing>

Figure 26:
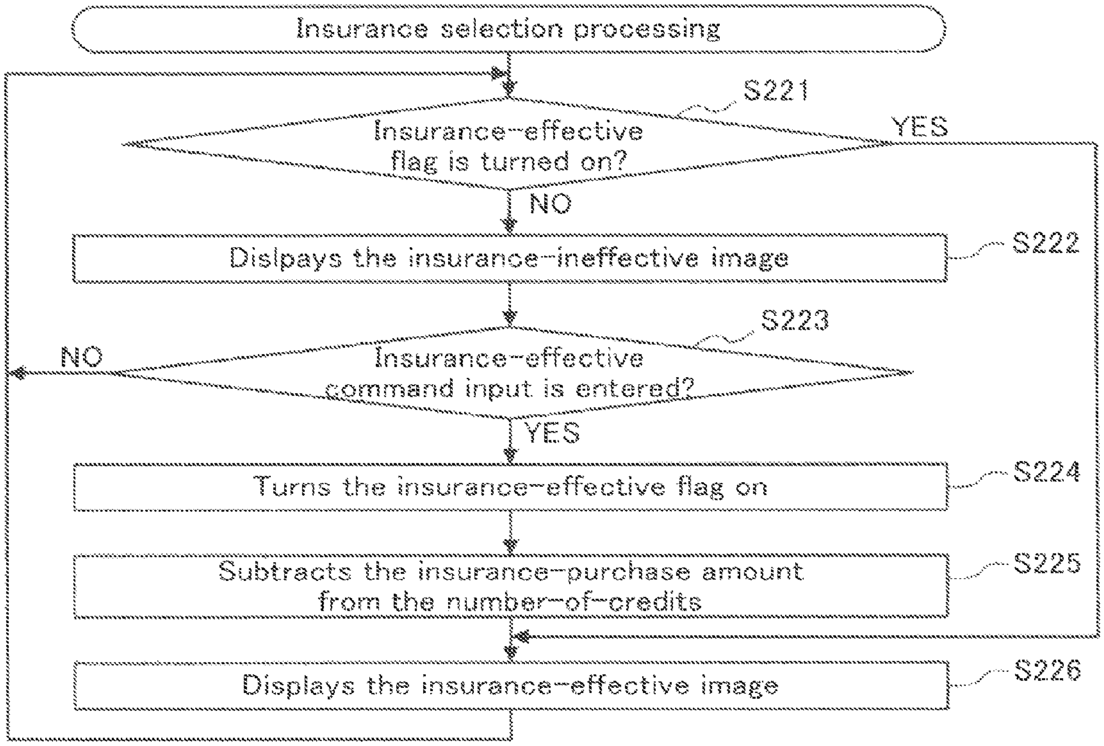
FIG. 26 is a flowchart showing insurance selection processing in the gaming machine according to the embodiment of the present invention.

Next, with reference to FIG. 26, the insurance selection processing is described. FIG. 26 is a view illustrating a flowchart of the insurance selection processing for the gaming machine according to the embodiment of the present invention.

First, the main CPU 71 determines whether or not the insurance-effective flag is turned on (step S221). When the main CPU 71 determines that the insurance-effective flag is not turned on, the main CPU 71 displays an insurance-ineffective image (step S222). The main CPU 71 transmits a command to display the insurance-ineffective image to the graphic board 130. Based on the command, the graphic board 130 generates the insurance-ineffective image and displays the image to the lower image display panel 141.

As the insurance-ineffective image, for example, an image showing "INSURANCE BET $1.00 TOUCH TO BET" is displayed. This image is an image for prompting the player to select whether or not to make the insurance effective, and notifying the player of the amount required for making the insurance effective. The player can input a command to make the insurance effective by touching a predetermined place on the touch panel 114.

Subsequently, the main CPU 71 determines whether or not an insurance-effective command input has been entered (step S223). When the main CPU 71 determines that the insurance-effective command input has not been entered, the main CPU 71 shifts the processing to step S221 with the insurance-effective flag turned off. On the other hand, when the main CPU 71 determines that the insurance-effective command input has been entered, the main CPU 71 turns the insurance-effective flag on (step S224).

Next, the main CPU 71 subtracts the insurance-purchase amount from the number-of-credits counter (step S225). In the present embodiment, an amount corresponding to, for example, one dollar is subtracted from the number-of-credits counter. After step S225 or when determining in step S221 that the insurance-effective flag is turned on, the main CPU 71 displays the insurance-effective image (step S226).

As the insurance-effective image, for example, an image showing "INSURANCE CONTINUED WIN 200 CREDIT" is displayed. This image is an image informing the player that the insurance is effective, and that the value of "200" is to be added to the number-of-credits counter when the insurance condition is satisfied. After the processing has been conducted, the processing is shifted to step S221.

Hereinabove, a further description of the embodiment has been given. With the gaming machine 1 according to the embodiment, in a configuration in which the upper effect portion 131 is provided upward of the lower image display panel 141 on which video reels 3 to which a player pays his or her attention are to be displayed, speakers 112C and 112D are provided at their appropriate positions, each of which is as high as that of the upper effect portion 131 (at each of the positions which is higher than each of those of speakers 112A and 112B) in addition to the speakers 112A and 112B which are provided at their appropriate positions, each of which is as high as that of the lower image display panel 141. Effect sounds are outputted by employing these speakers 112A to 112D, whereby when an effect exerted by light is provided at the upper effect portion 131, an effect can be added in such a manner as if the effect sounds were audible in the same direction as that of the light. This effect is directed to an effect in which it is audible as if the position of a generation source of sound were moving. In this manner, the attention of a player, which has been paid to video reels 3 in general and has not been paid to an upward side, can be drawn to the upper effect portion 131. Therefore, an effect exerted by light can be more effective. By providing such an effect, even in the case where the gaming machine 1 is constructed to be large in vertical direction, it is possible to guide the player's eyes due to movement of light, as the effect exerted by means of image or light is provided at an upper part on which the player less frequently takes a look unless he or she consciously does so. Hence, a space or the like which has not been used so far can be efficiently used. While the foregoing embodiment described a case in which an effect simulating volcanic eruptions is provided, as shown in FIG. 6, the present invention is not limited thereto. For example, as shown in FIG. 27, in the case of providing a variety of effects, such as providing an effect which simulates roulette, a more effective effect can be provided by providing an effect exerted by positional change of a sound image in addition to the effect exerted by image or light.

Figure 27:
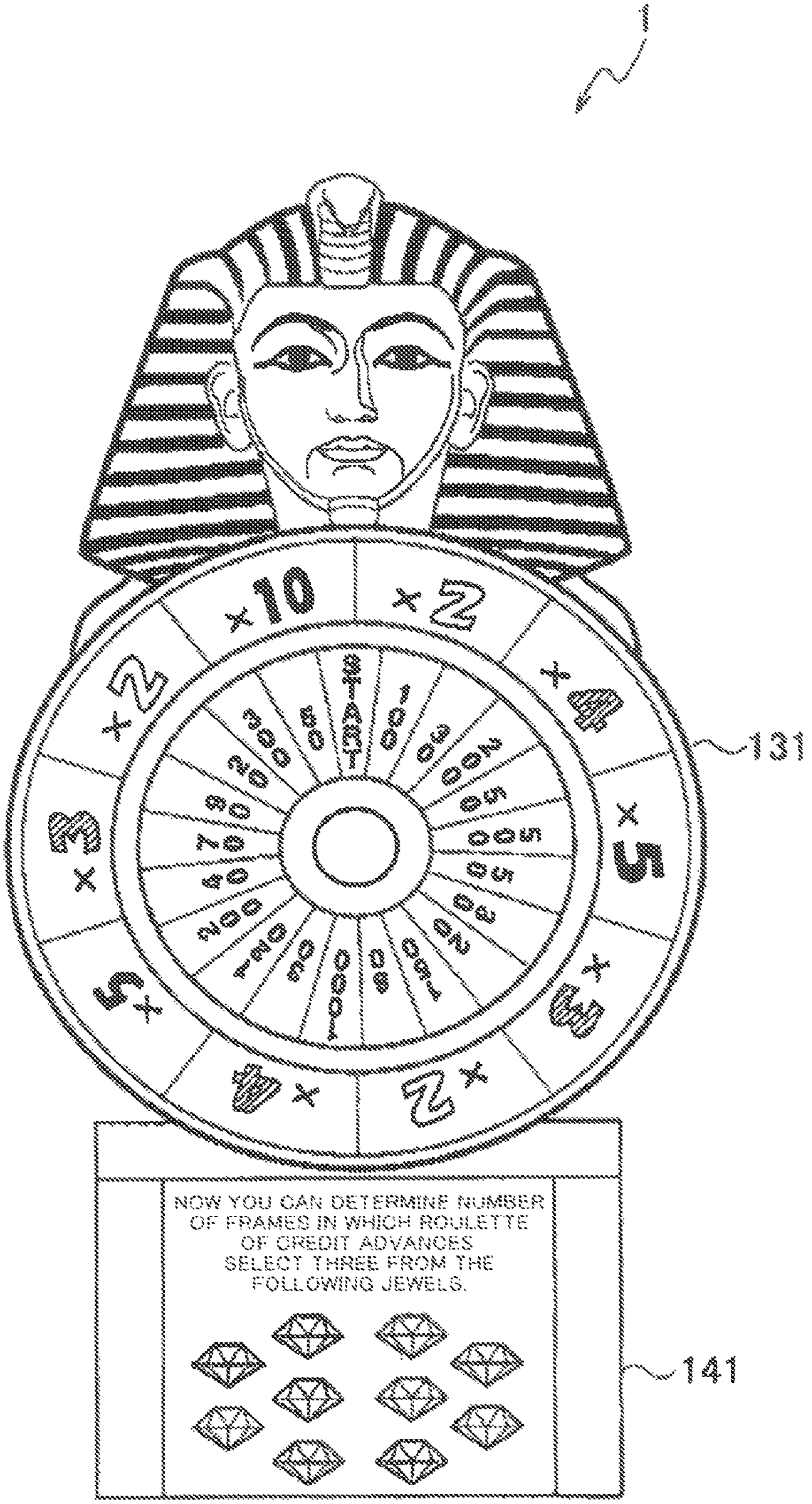
FIG. 27 is a front view showing an upper effect portion according to another embodiment of the present invention.

In an example shown in FIG. 27, an effect is provided in such a manner that a roulette rotates and then stops at a predetermined position in big bonus game display control processing (step S213 in FIG. 24), and concurrently, a sound image can be moved from downward to upward due to an effect of effect sounds exerted by the speakers 112A to 112D. In this manner, the player's attention can be drawn to the roulette provided upward. Movements in various directions including a horizontal direction may be made without being limitative to a mere movement in sound vertical direction. For example, an effect may be provided in such a manner that an effect sound rotates as if it were drawing an arc upward with rotation of roulette. A change in a longitudinal direction as well as a two-dimensional vertical or horizontal displacement may be made.

An effect sound is not limited to the above effect sounds. For example, an effect can be provided in such a manner that when roulette rotates, its sound source moves upward while a word such as "You've got a chance for roulette!" is generated from the speakers 112A to 112D.

In a control method for allowing an effect sound to be audible as if it were moving, the orientations of the respective speakers 112A to 112D may be changed in addition to or in place of controlling a phase or a volume of the sounds outputted from the respective speakers 112A to 112D.

While the foregoing embodiment described a case in which a sound effect is provided by 4.1-ch while the woofer 310 is added, the number of speakers is not limited thereto. A number of various types of speakers can be applied. The woofer 310 can also be eliminated.

While the foregoing embodiment described an effect of moving a sound image upward, such a sound image can be moved downward without being limitative thereto. In this case, an effective effect together with another effect means can be provided by providing a means for vibrating a player's chair, as a sound moves downward, for example. That is, a variety of elements such as vibration, as well as the effect exerted by image or light, can be employed in an effect which is executed together with a sound effect. A sound effect may be provided in corporation with the adjacent gaming machines without being limitative to an independent effect of only one gaming machine 1. For example, an effect is provided in such a manner that a sound image moves in a transverse direction over a plurality of gaming machines, whereby the state of the play of game or the like in other gaming machines 1 can also be employed in an effect. In this case, if a state of the play of game advantageous to a player at another gaming machine takes place, the attention of another player can be drawn by providing an effect in such a way that a sound image is moved in that direction.

While the foregoing embodiment described a case in which an effect exerted by means of sound is associated with an effect exerted by means of light or image, such an effect exerted by means of sound may be provided solely without being limitative thereto.

While in the foregoing embodiment, an effect due to movement of a sound image was adapted to be provided at the time of big bonus game, the present invention is not limited thereto. For example, this effect may also be provided in small bonus game, and a variety of timings of providing a sound effect can also be applied.

Figure 28:
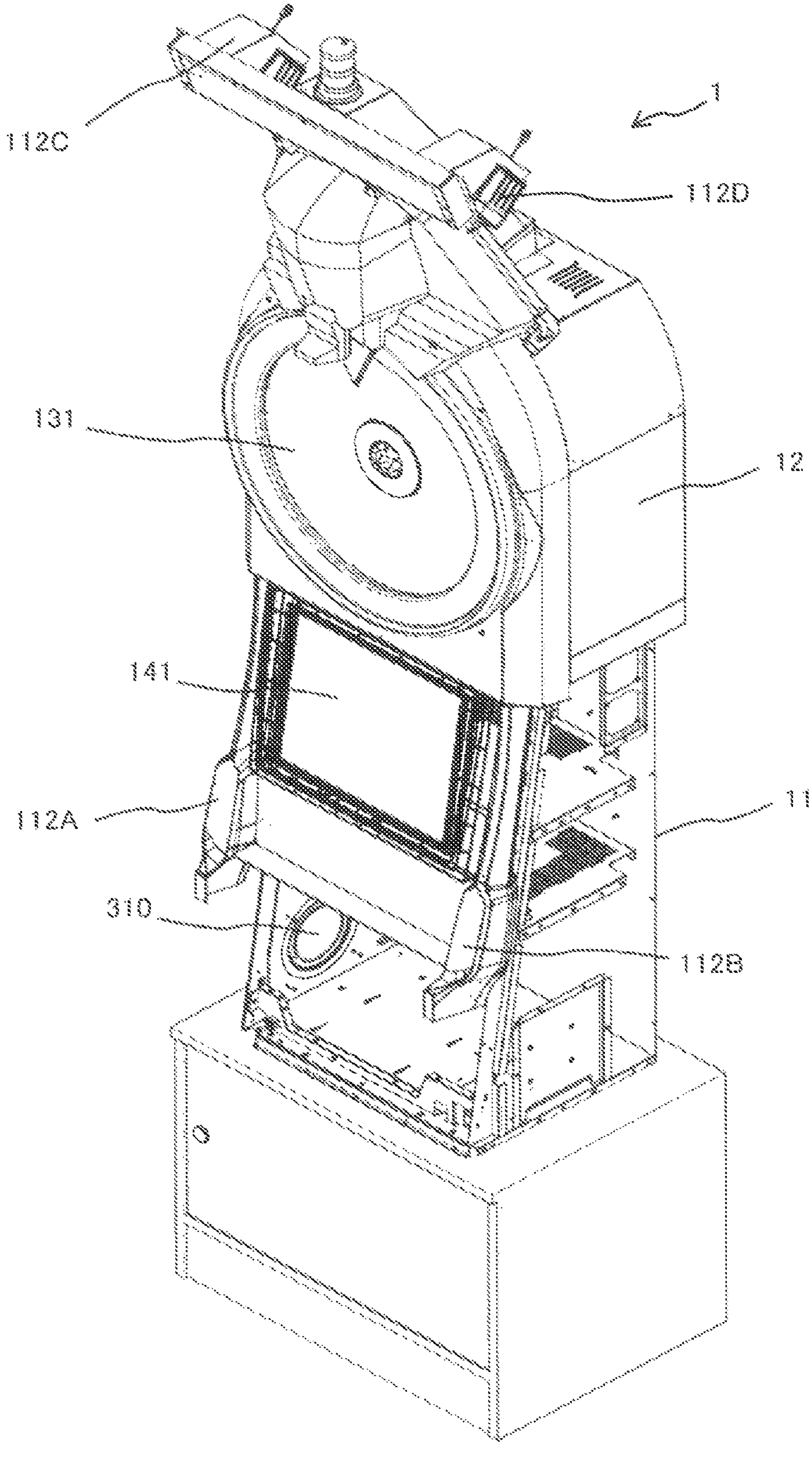
FIG. 28 is a perspective view showing a gaming machine according to another embodiment of the present invention.

FIG. 28 is a perspective view showing a gaming machine 1 having an upper effect portion 131 simulating the roulette shown in FIG. 27. FIG. 28 shows a state in which an operating panel portion and a side plate of a cabinet 11 or the like are eliminated. A woofer 310 is mounted on a side part of the cabinet 11, as shown in FIG. 28. By means of this woofer, a 4.1-ch surround can be configured together with the speakers 112A to 112D. The sounds that are outputted from these speakers and/or woofer are controlled by means of the main CPU 71.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, other configurations requested for performing each step should become apparent from the above descriptions.

What is claimed is:

1. A gaming machine, comprising:
- a first display portion that displays a plurality of reels;
- a second display portion that generates a display effect and is disposed adjacent to the first display portion;
- a plurality of speakers which are disposed around the first display portion and the second display portion; and
- a controller that controls the plurality of speakers to generate a sound effect,
- wherein the display effect generated by the second display portion comprises a light moving from a first direction to a second direction and the sound effect generated by the plurality of speakers comprises a moving of a sound image accompanying the light moving,
- wherein the second display portion comprises a plurality of light sources arranged in series and wherein the light moving is embodied by maintaining the plurality of light sources turned-on at least until the light source furthest from the first display portion is turned-on.

2. The gaming machine according to claim 1, wherein: the first display portion is disposed on a first cabinet portion and the second display portion is disposed on a second cabinet portion; and the plurality of speakers are provided at a respective one of the first cabinet portion and the second cabinet portion.

3. The gaming machine according to claim 1, wherein the plurality of speakers are inclined toward the first display portion and the second display portion to face a player who plays at the gaming machine.

4. The gaming machine according to claim 1, wherein the moving of a sound image is embodied by controlling the plurality of speakers to output sound moving from the first direction to the second direction in a stepwise manner accompanying the light moving from the first direction to the second direction.

5. The gaming machine according to claim 1, wherein the light moving is executed when a magnitude of an awarded bonus exceeds a predetermined amount.

6. The gaming machine according to claim 1, wherein an amount of payment to be awarded to a player who plays at the gaming machine is determined in accordance with the expansion of the light emitting area in the second display portion and the sound image moves accompanying the expansion of the light emitting area, thereby guiding the player's eyes from the first display portion to the second display portion where an image determining the award is displayed.

7. A gaming machine, comprising:

a first display portion that displays a plurality of reels;

a second display portion that generates a display effect and is disposed adjacent to the first display portion;

a plurality of speakers which are disposed around the first display portion and the second display portion; and a controller that controls the plurality of speakers to generate a sound effect, wherein the display effect generated by the second display portion comprises a light moving from a first direction to a second direction and the sound effect generated by the plurality of speakers comprises a moving of a sound image accompanying the light moving, wherein the second display portion comprises a plurality of light sources arranged in series and wherein the light moving is embodied by maintaining the plurality of light sources turned-on at least until a predetermined light source is tuned-on.

8. The gaming machine according to claim 7, wherein: the first display portion is disposed on a first cabinet portion and the second display portion is disposed on a second cabinet portion; and the plurality of speakers are provided at a respective one of the first cabinet portion and the second cabinet portion.

9. The gaming machine according to claim 7, wherein the plurality of speakers are inclined toward the first display portion and the second display portion to face a player who plays at the gaming machine.

10. The gaming machine according to claim 7, wherein the moving of a sound image is embodied by controlling the plurality of speakers to output sound moving from the first direction to the second direction in a stepwise manner accompanying the light moving from the first direction to the second direction.

11. The gaming machine according to claim 7, wherein the light moving is executed when a magnitude of an awarded bonus exceeds a predetermined amount.

12. The gaming machine according to claim 7, wherein an amount of payment to be awarded to a player who plays at the gaming machine is determined in accordance with the expansion of the light emitting area in the second display portion and the sound image moves accompanying the expansion of the light emitting area, thereby guiding the player's eyes from the first display portion to the second display portion where an image determining the award is displayed.

* * * * *